US008490035B2

(12) United States Patent
Grbic et al.

(10) Patent No.: US 8,490,035 B2
(45) Date of Patent: Jul. 16, 2013

(54) TENSOR TRANSMISSION-LINE METAMATERIALS

(75) Inventors: Anthony Grbic, Ann Arbor, MI (US); Gurkan Gok, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 12/945,798

(22) Filed: Nov. 12, 2010

(65) Prior Publication Data

US 2011/0209110 A1 Aug. 25, 2011

Related U.S. Application Data

(60) Provisional application No. 61/260,705, filed on Nov. 12, 2009.

(51) Int. Cl.
*G06F 17/50* (2006.01)

(52) U.S. Cl.
USPC ............................ 716/100; 716/110; 716/111

(58) Field of Classification Search
USPC ........................... 716/110, 111; 343/851, 910
See application file for complete search history.

(56) References Cited

U.S. PATENT DOCUMENTS

| | | | | |
|---|---|---|---|---|
| 4,595,899 | A | 6/1986 | Smith et al. | |
| 4,955,692 | A | 9/1990 | Merlin et al. | |
| 6,859,114 | B2 | 2/2005 | Eleftheriades et al. | |
| 7,777,594 | B2 | 8/2010 | Eleftheriades | |
| 7,830,310 | B1 | 11/2010 | Sievenpiper et al. | |
| 7,911,407 | B1 | 3/2011 | Fong et al. | |
| 7,929,147 | B1 | 4/2011 | Fong et al. | |
| 8,003,965 | B2 | 8/2011 | Grbic et al. | |
| 8,026,862 | B2 * | 9/2011 | Pendry et al. | 343/851 |
| 2006/0192115 | A1 | 8/2006 | Thomas et al. | |
| 2009/0230333 | A1 | 9/2009 | Eleftheriades | |
| 2010/0156573 | A1 * | 6/2010 | Smith et al. | 333/239 |
| 2010/0271284 | A1 * | 10/2010 | Pendry et al. | 343/910 |
| 2011/0209110 | A1 * | 8/2011 | Grbic et al. | 716/110 |

FOREIGN PATENT DOCUMENTS

EP 0 660 370 B1 2/2003

OTHER PUBLICATIONS

Grbic et al., "Overcoming the Diffraction Limit with a Planar Left-Handed Transmission-Line Lens," Phys. Rev. Lett. 92:117403-01-117403-04 (2004).

Grbic et al., "Practical Limitations of Subwavelength Resolution Using Negative-Refractive-Index Transmission-Line Lenses," IEEE Trans. on Antennas and Propagation 53(10):3201-3209 (2005).

Merlin, "Analytical Solution of the Almost-Perfect-Lens Problem," Appl. Phys. Lett. 84:1290-1292 (2004).

Merlin, "Radiationless Electromagnetic Interference: Evanescent-Field Lenses and Perfect Focusing," Science, 317:927-929 (2007).

Mesa et al., "Three-Dimensional Superresolution in Metamaterial Slab Lenses: Experiment and Theory," Physical Review B, 72:235117-1-235117-6 (2005).

(Continued)

*Primary Examiner* — Stacy Whitmore
*Assistant Examiner* — Mohammed Alam
(74) *Attorney, Agent, or Firm* — Marshall, Gerstein & Borun LLP

(57) ABSTRACT

Tensor transmission-line metamaterial unit cells are formed that allow the creation of any number of optic/electromagnetic devices. A desired electromagnetic distribution of the device is determined, from which effective material parameters capable of creating that desired distribution are obtained, for example, through a transformation optics/electromagnetics process. These effective material parameters are then linked to lumped or distributed circuit networks that achieve the desired distribution.

21 Claims, 16 Drawing Sheets

OTHER PUBLICATIONS

Pendry, “Negative Refraction makes a Perfect Lens,” Phys. Rev. Lett. 85:3966-3969 (2000).
Grbic, “Near-Field Focusing Plates and Their Design,” IEEE Transactions on Antennas and Propagation, 56(10):3159-3165 (2008).
Grbic, et al. “Near-Field Plates: Subdiffraction Focusing with Patterned Surfaces,” Science 320:511-513 (2008).
Wong et al., “Metallic Transmission Screen for Sub-Wavelength Focusing,” Electronics Letters, 43(25):2 pages (2007).
Shelby et al., “Experimental verification of a negative index of refraction,” Science, 292:77-79 (2001).
Pendry et al., “Controlling electromagnetic fields,” Science, 312:1780-1782 (2006).
Schurig et al., “Metamaterial electromagnetic cloak at microwave frequencies,” Science 314:977-980 (2006).
Fong et al., “Scalar and Tensor Holographic Artificial Impedance Surfaces,” Antennas and Propagation, IEEE Transactions, 58(10):3212-3221 (2010).
Engheta et al., “Circuit elements at optical frequencies: Nanoinductors, nanocapacitors, and Nanoresistors,” Phys. Rev. Lett., 95:095504-095504 (2005).

* cited by examiner

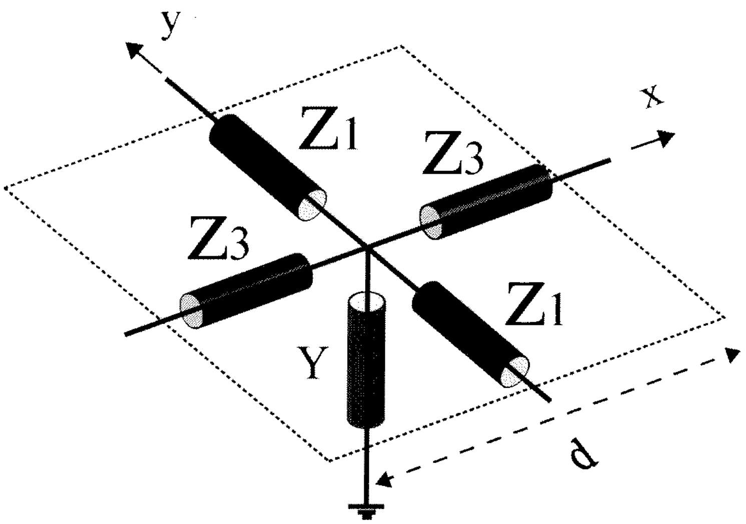
*Fig. 2*
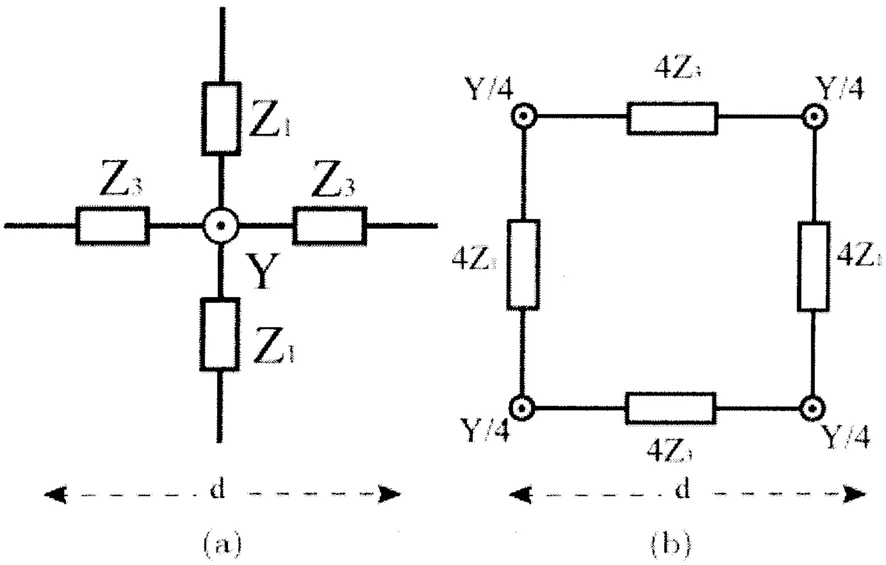
*Fig. 3a* *Fig. 3b*

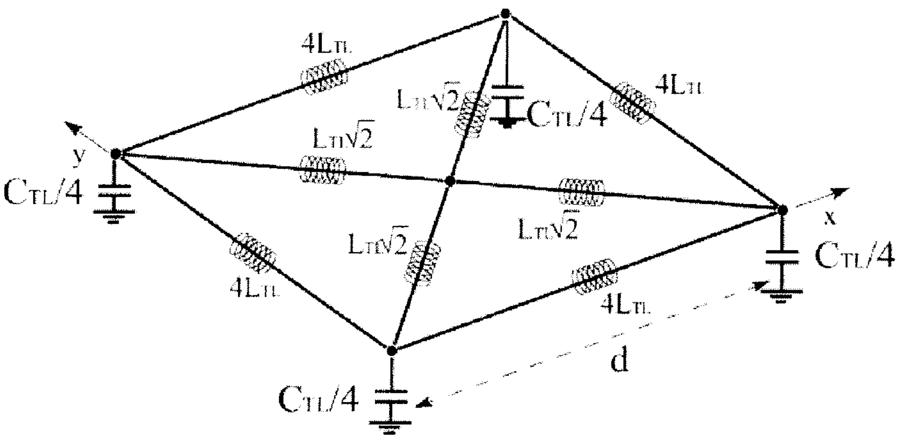
*Fig. 11*
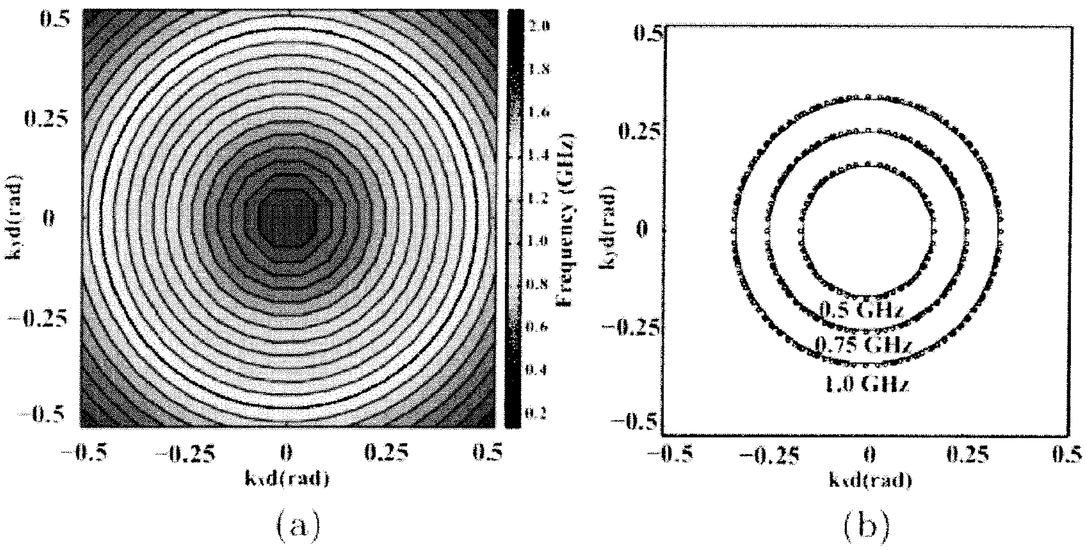
*Fig. 12(a)* *Fig. 12(b)*

(a)

(b)

(a)

(b)

TENSOR TRANSMISSION-LINE METAMATERIALS

CROSS REFERENCE TO RELATED APPLICATIONS

This application claims the benefit of U.S. Provisional Application No. 61/260,705, filed Nov. 12, 2009, the entirety of which is expressly incorporated herein by reference.

STATEMENT OF GOVERNMENT INTEREST

This invention was made with government support under Contract Nos. FA9550-08-1-0067 and FA9550-09-1-0696 awarded by the Air Force Office of Scientific Research (AFOSR). The government has certain rights in the invention.

BACKGROUND OF THE DISCLOSURE

1. Field of the Disclosure

The disclosure relates generally to subwavelength-structured composite materials (known as metamaterials) and, more particularly, to techniques for using transmission-line networks to design metamaterials with arbitrary material tensors.

2. Brief Description of Related Technology

The first negative refractive index medium was introduced in the early 2000s and was implemented and tested at microwave frequencies [R. A. Shelby, D. R. Smith, and S. Schultz, "Experimental verification of a negative index of refraction," *Science*, vol. 292, pp. 77-79, April 2001]. The work, along with introduction of the "perfect lens" (negative refractive index superlens) by John B. Pendry initiated great interest in subwavelength-structured composite materials possessing tailored electromagnetic properties, materials known today as metamaterials. Soon after these initial experiments, a transmission-line (TL) approach to synthesizing negative refractive index metamaterials was developed [U.S. Pat. No. 6,859,114]. In that TL approach, a host transmission line is periodically loaded with reactive elements. For example, two dimensional isotropic and anisotropic transmission-line metamaterials could be realized that exhibit both negative and positive effective material parameters [Negative *Refraction Metamaterials: Fundamental Principles and Applications*, G. V. Eleftheriades and K. G. Balmain, Eds. Hoboken, N.J.: Wiley-IEEE Press, 2005]. While metamaterials could be developed, these TL-based metamaterials were limited in that they had diagonal material tensors in the Cartesian basis (a grid aligned with the rectangular unit cell dimensions).

Numerous theoretical devices have been proposed that are designed using transformation optics/electromagnetics [J. B. Pendry, D. Schurig, and D. R. Smith, "Controlling electromagnetic fields," *Science*, vol. 312, pp. 1780-1782, June 2006], but few practical realizations have been reported. The few experimental structures reported have either used isotropic metamaterials or metamaterials with contoured unit cells that follow the geometry of the structure, to simplify the required material tensors so that only diagonal tensors are used. For example, in [D. Schurig, J. J. Mock, B. J. Justice, S. A. Cummer, J. B. Pendry, A. F. Starr, and D. R. Smith, "Metamaterial electromagnetic cloak at microwave frequencies," *Science, vol.* 314, pp. 977-980, November 2006.], a cylindrical invisibility cloak was implemented with curved cells which allowed tensor materials that are diagonal in the cylindrical basis to be used. However, if one desires arbitrary control of electromagnetic fields, one must have the ability to design metamaterials with arbitrary material tensors (possessing diagonal and off-diagonal tensor elements). Arbitrary control over the medium in which an electromagnetic field exists translates to arbitrary control over the electromagnetic field itself There have also been efforts to develop tensor impedance surfaces, which could be used, for example, to convert linearly polarized radiation to circular polarization. The surfaces have been referred to as artificial tensor impedance surfaces and in design contain trapezoidal metallic patches over a metal-backed dielectric substrate. Sievenpiper et al. [Fong, B. H.; Colburn, J. S.; Ottusch, J. J.; Visher, J. L.; Sievenpiper, D. F.; "Scalar and Tensor Holographic Artificial Impedance Surfaces," *Antennas and Propagation, IEEE Transactions on*, vol. 58, no. 10, pp. 3212-3221, October 2010] have used parametric studies to form a database of metallic patch geometries and their corresponding surface impedance tensors. This cataloging, however, can be time consuming since no clear relationship between geometry and impedance tensor has been identified. In addition, methods of extending the technique to other frequency regimes have not been proposed.

SUMMARY OF THE DISCLOSURE

The present techniques are able to address the shortcomings of the state of the art in a number of ways. For example, provided herein is a rectangular unit cell that can be used to implement arbitrary material tensors, for a particular electric field polarization. The tensor metamaterials proposed here directly relate circuit networks to tensor material parameters (permittivity and permeability). The techniques herein allow metamaterial discretization over a uniform or non-uniform grid, while permitting arbitrary material tensors with spatial gradients. Furthermore, the approach is transmission-line based (based on traveling-wave structures) and therefore promises broad bandwidths of operation and low losses. With regards to tensor impedance surfaces proposed by Sievenpiper et al., the present technique provides a more direct approach to tensor metamaterial synthesis. It does not require the lengthy parameter sweeps that have been employed to date to map different geometries to impedance tensors. Techniques herein are able to directly relate material tensors to circuit quantities. These circuit quantities can then be implemented using either distributed or lumped circuit elements.

Advantageously, this new approach to tensor metamaterials may be readily applied to the RF, microwave and millimeter-wave spectrum, and in some examples extended to higher frequencies, for example, by employing the concept of nano-circuit elements [N. Engheta, A. Salandrino, and A. Alu, "Circuit elements at optical frequencies: Nanoinductors, nanocapacitors, and Nanoresistors," *Phys. Rev. Lett.*, vol. 95, pp. 095504-095504, August 2005].

In accordance with an example, a method for forming an electromagnetic metamaterial with arbitrary material permittivity and/or permeability tensors, comprises: directly mapping a material described by a 2×2 effective permeability tensor and permittivity constant, or by a 2×2 effective permittivity tensor and permeability constant, to a two-dimensional electrical network that can be described by an impedance tensor and scalar admittance, or an admittance tensor and a scalar impedance; and converting the two dimensional electrical network to a two-dimensional loaded transmission-line network, wherein the metamaterial comprises the loaded transmission-line network such that when excited with a specified excitation the metamaterial produces a desired electromagnetic field distribution.

In some examples the metamaterial comprises a plurality of unit cells that may be isotropic, while in other examples the unit cells may be anisotropic. While tensor TL metamaterial unit cells having 2×2 tensor material parameters are given as an example, the unit cells may have a 2×2 or 3×3 material tensors. And the unit cells may be configured for p- or s-polarization.

In accordance with another example, a method for forming electromagnetic metamaterials with arbitrary material permittivity and/or permeability tensors using loaded transmission-line networks, comprises: selecting a desired electromagnetic field distribution; determining the effective material parameters needed to achieve the desired electromagnetic field distribution for a specific excitation; and mapping the effective material parameters to a two-dimensional loaded transmission network forming a tensor transmission-line (TL) metamaterial, such that when excited the metamaterial produces the desired electromagnetic field distribution.

BRIEF DESCRIPTION OF THE DRAWING FIGURES

For a more complete understanding of the disclosure, reference should be made to the following detailed description and accompanying drawing figures, in which like reference numerals identify like elements in the figures, and in which:

FIG. 2 illustrates a perspective view of the 2-branch TL metamaterial unit cell;

Figure 4:
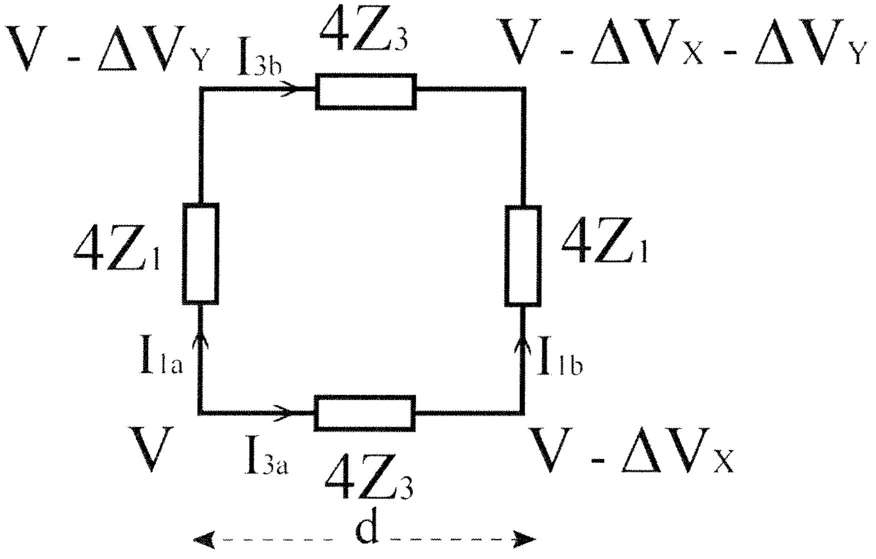
Figure 5A:
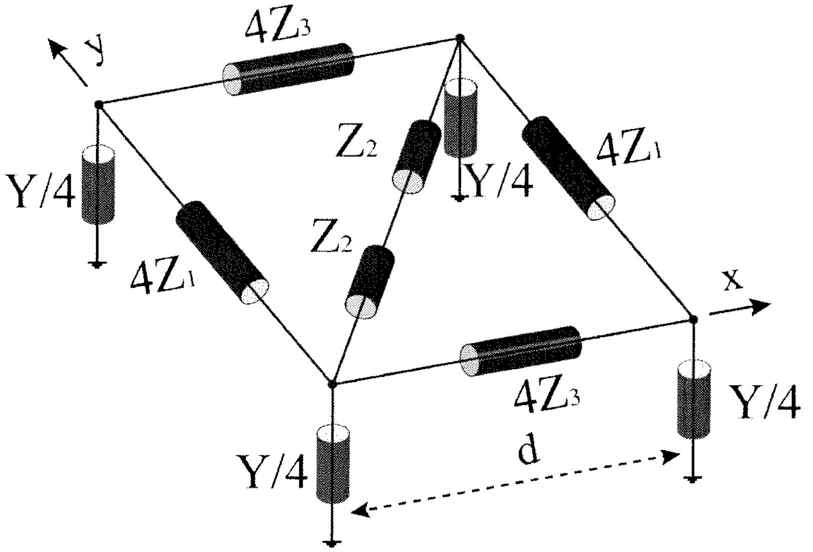
Figure 5B:
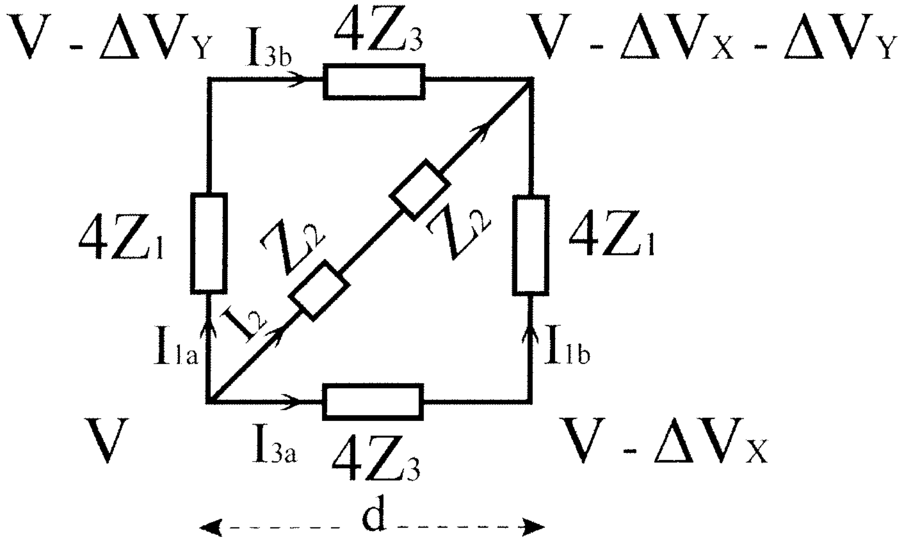
Figure 5C:
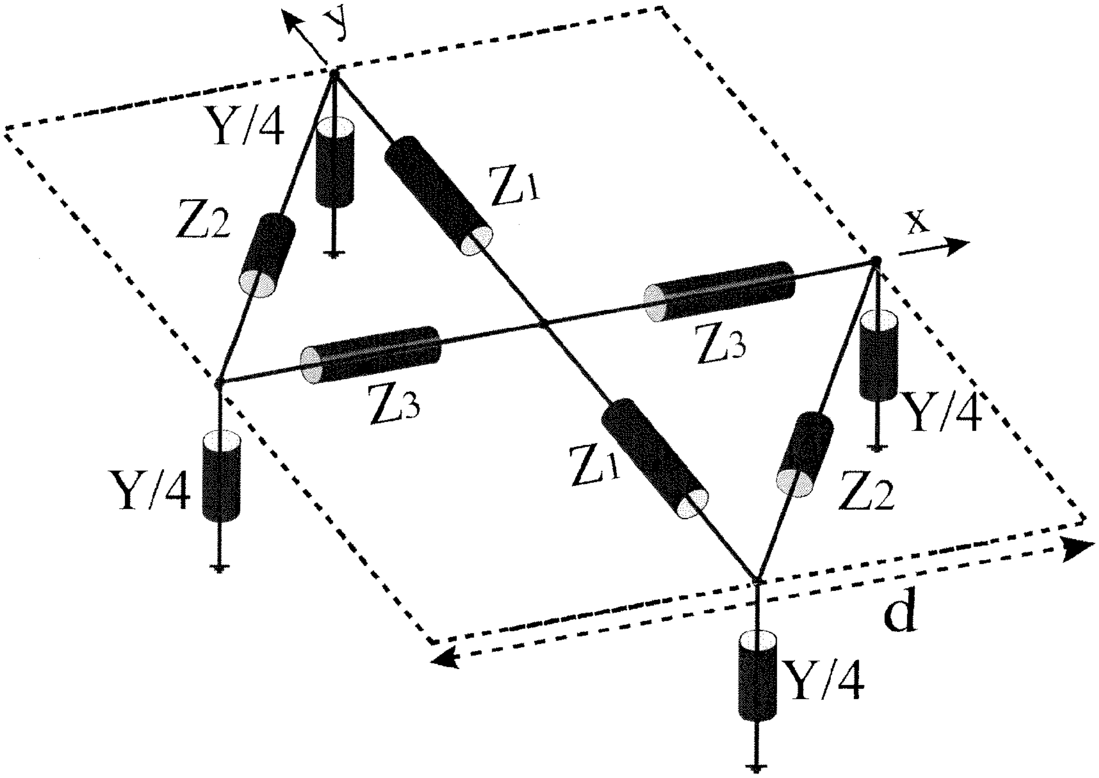
Figure 6A:
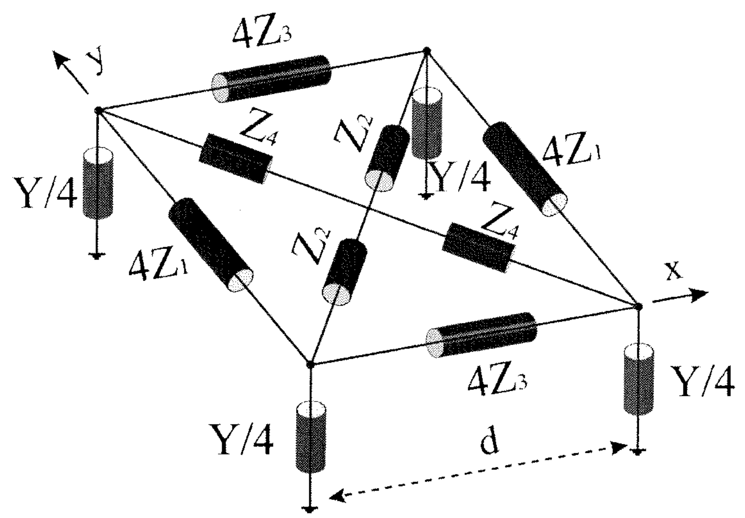
Figure 6B:
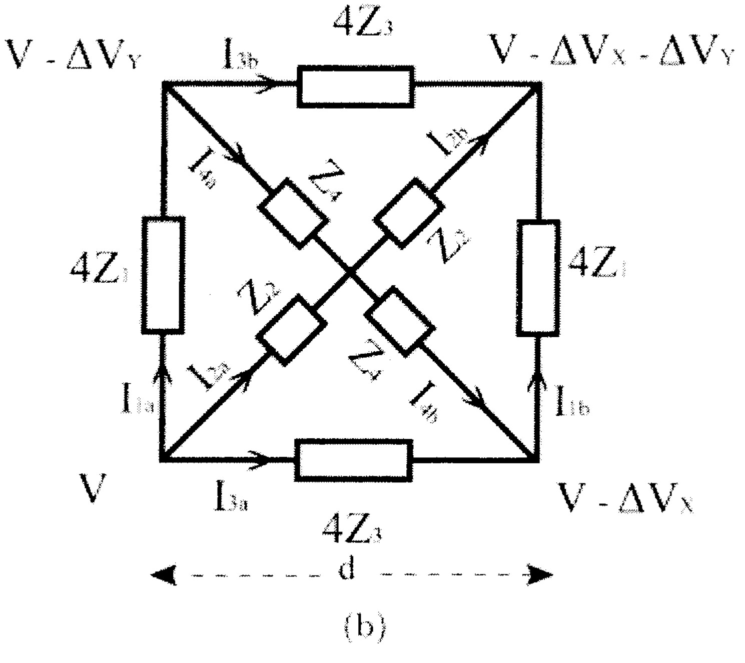
Figure 6C:
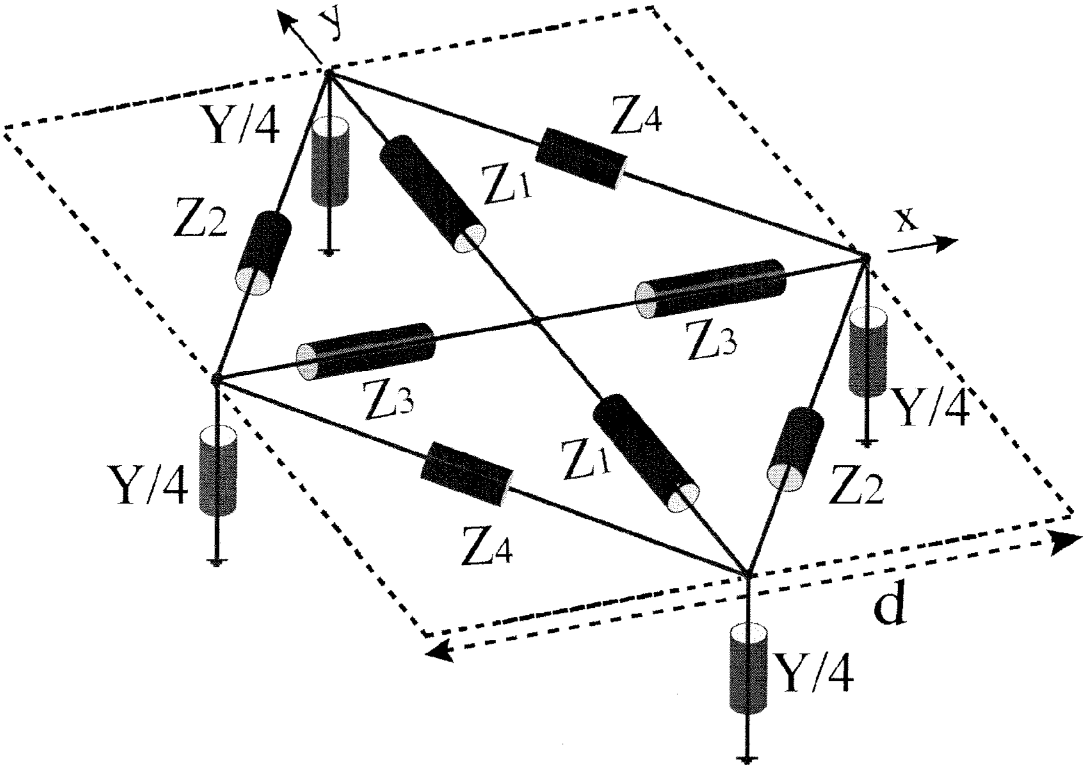
Figure 7:
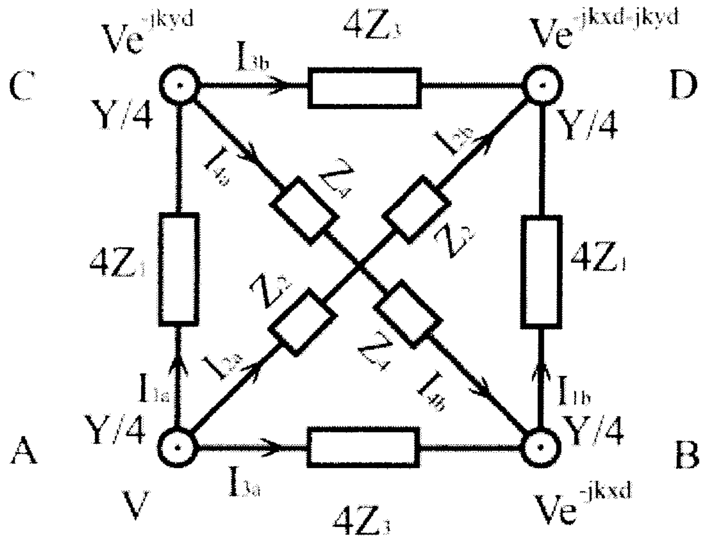
Figure 8:
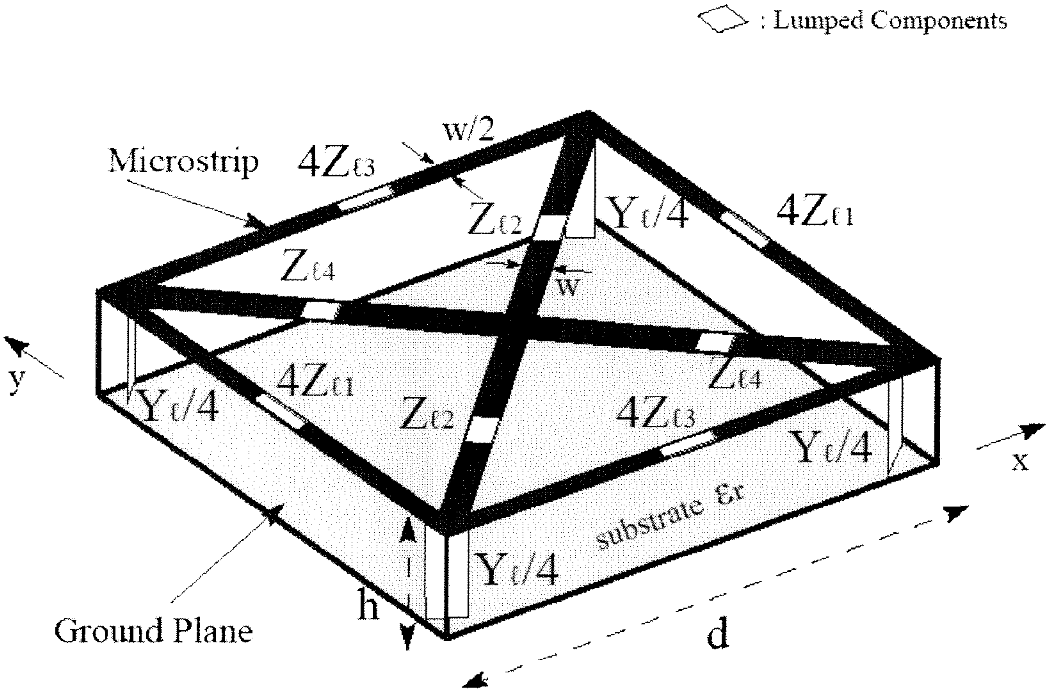
Figure 9:
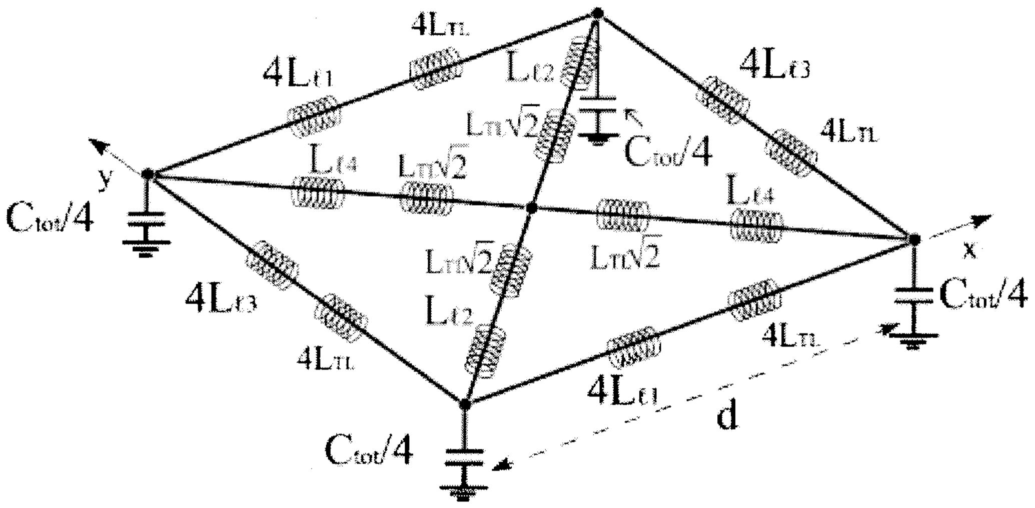
Figure 10:
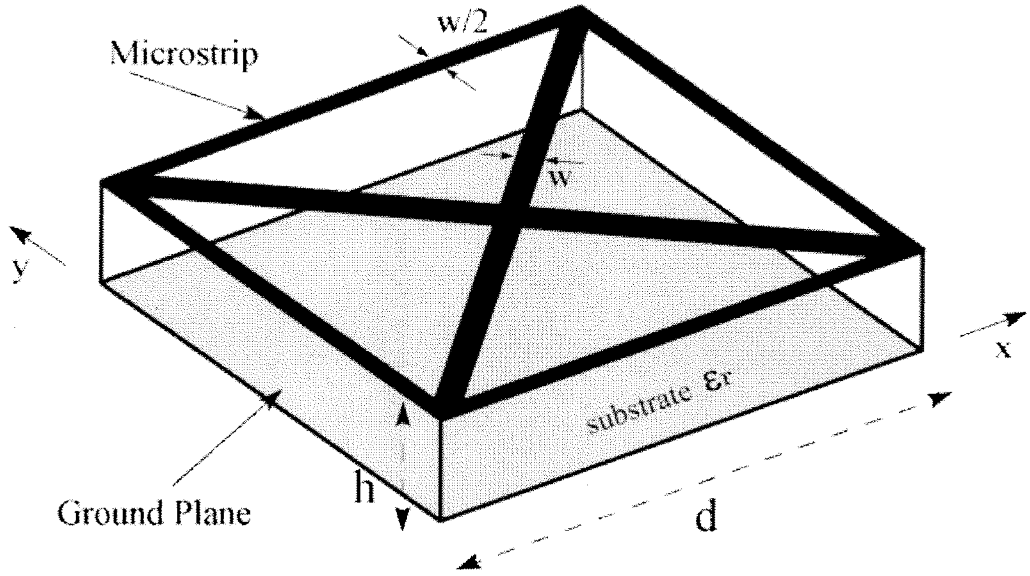

FIGS. 3(*a*) and 3(*b*) illustrate top views of two different unit cell choices for the 2-branch TL metamaterial shown in FIG. 2, in which the FIG. 3(*a*) is a cross unit cell of the 2-branch TL metamaterials and FIG. 3(*b*) is a square unit cell of the 2-branch TL metamaterials;

FIG. 4 is a top view of square unit cell of FIG. 3(*b*) as used to extract the impedance tensor of the 2-branch TL metamaterial unit cell;

FIG. 5(*a*) is a perspective view of a 3-branch tensor TL metamaterial unit cell; FIG. 5(*b*) is the cell configuration used to extract the impedance tensor of the 3-branch TL metamaterial unit cell; and FIG. 5(*c*) is a perspective view of an alternative 3-branch tensor TL metamaterial unit cell;

FIG. 6(*a*) is a perspective view of a 4-branch tensor TL metamaterial unit cell; FIG. 6(*b*) is the cell configuration used to extract the impedance tensor of the 4-branch metamaterial unit cell; and FIG. 6(*c*) is a perspective view of an alternative 4-branch tensor TL metamaterial unit cell;

FIG. 7 is a top view of the 4-branch tensor TL metamaterial unit cell of FIG. 6(*a*) under a Bloch wave excitation;

FIG. 8 illustrates a microstrip implementation of the tensor TL metamaterial depicted in FIG. 6(*a*);

FIG. 9 is a lumped element representation of the tensor TL metamaterial shown in FIG. 8;

FIG. 10 is a perspective illustration of a unit cell of an unloaded microstrip TL grid;

FIG. 11 is a lumped element representation of the unloaded microstrip TL grid shown in FIG. 10;

FIG. 12(*a*) illustrates isofrequency dispersion contours (obtained through full-wave electromagnetic simulation) of the unloaded microstrip grid depicted in FIG. 10; FIG. 12(*b*) is a plot of analytical versus full-wave simulation results, in which the solid lines and dots show the simulated and analytical isofrequency contours, respectively.

Figure 13A:
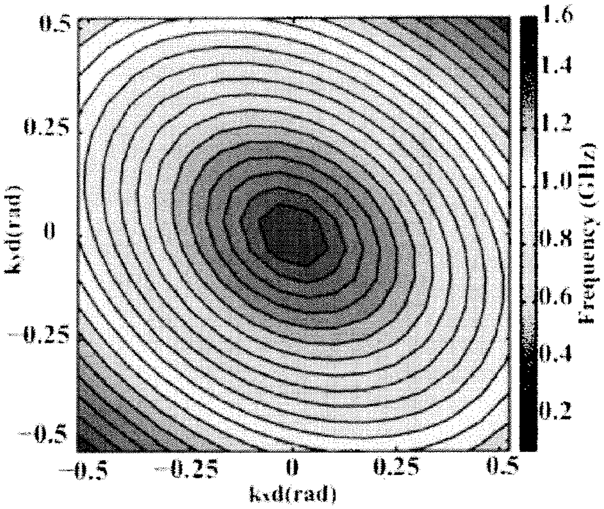
Figure 13B:
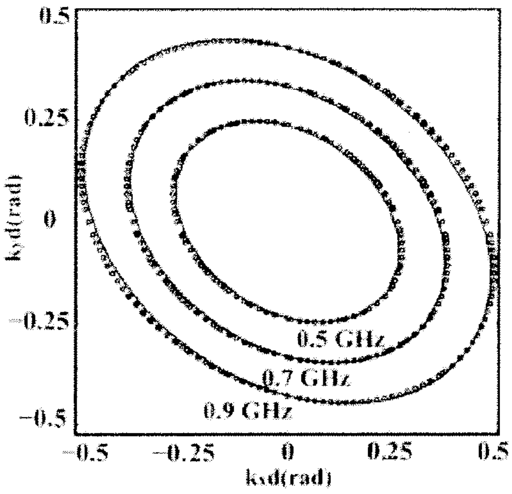

FIG. 13(*a*) illustrates isofrequency dispersion contours (obtained through full-wave electromagnetic simulation) of the tensor TL metamaterial depicted in FIG. 9 with the first set of loading elements considered; FIG. 13(*b*) is a plot of analytical versus full-wave simulation results, in which the solid lines and dots show the simulated and analytical isofrequency contours, respectively.

Figure 14A:
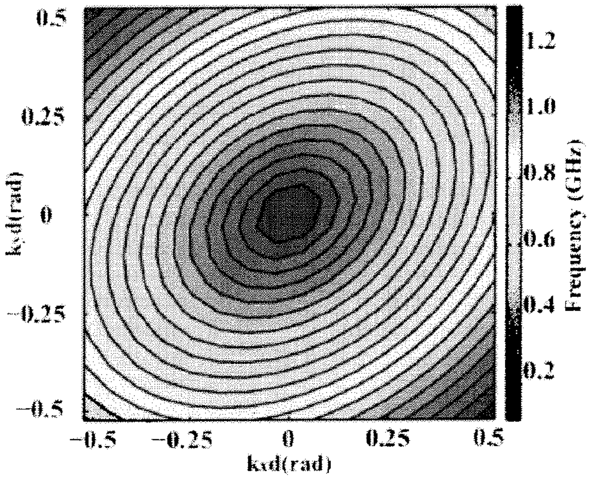
Figure 14B:
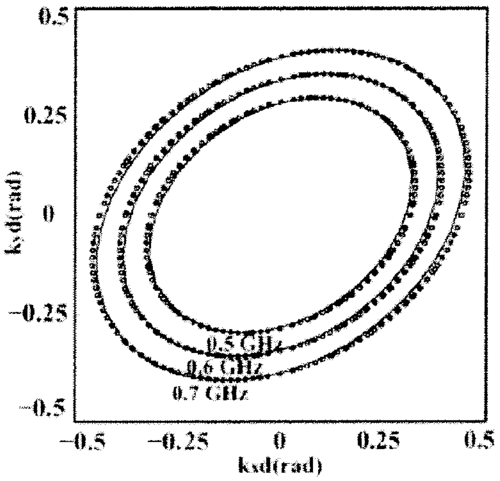

FIG. 14(*a*) illustrates isofrequency dispersion contours (obtained through full-wave electromagnetic simulation) of the tensor TL metamaterial depicted in FIG. 9 with the second set of loading elements considered; FIG. 14(*b*) is a plot of analytical versus simulation results, in which the solid lines and dots show the simulated and analytical isofrequency contours, respectively.

Figure 15:
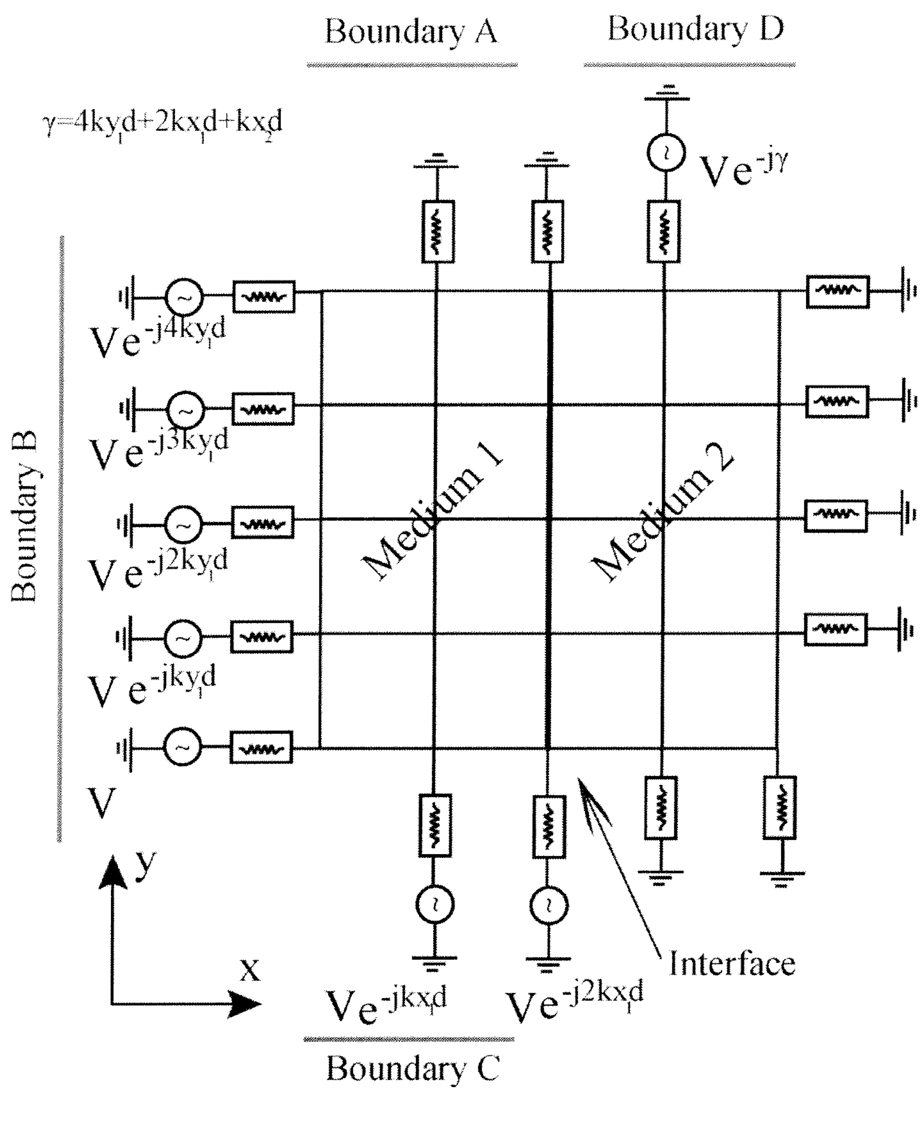
Figure 16:
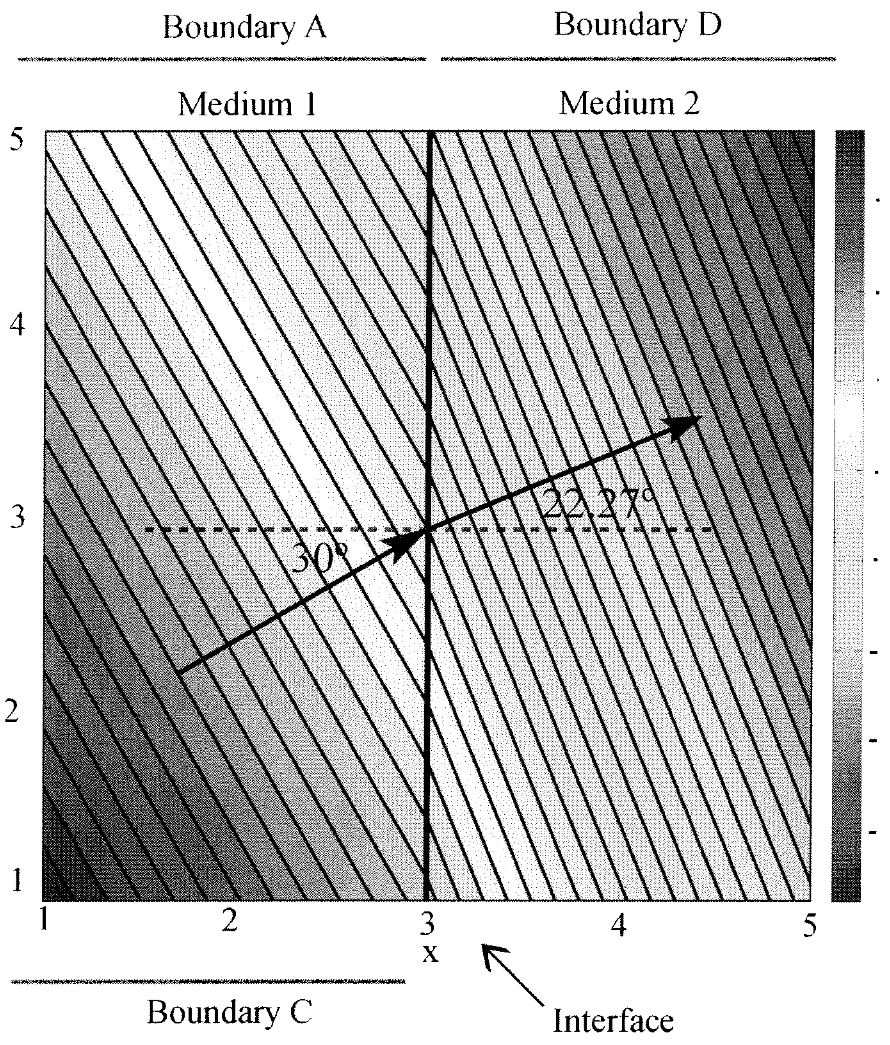
Figure 17:
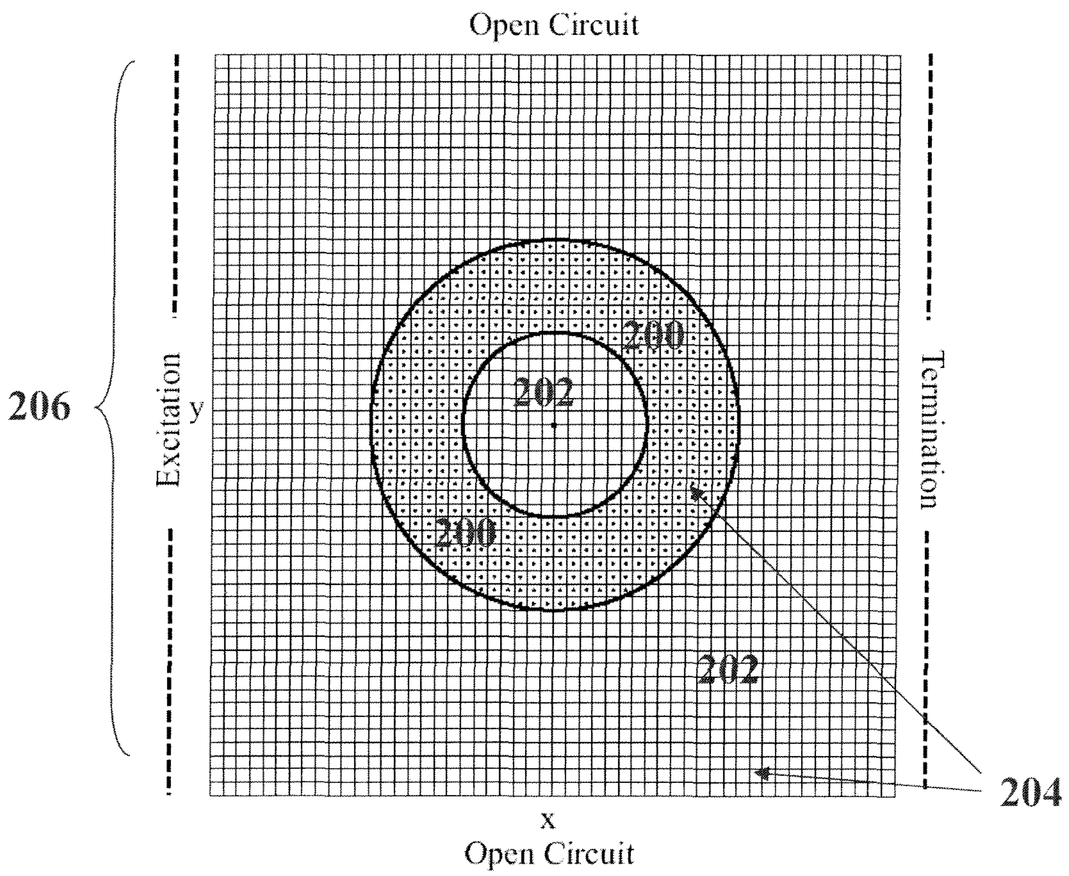
Figure 18:
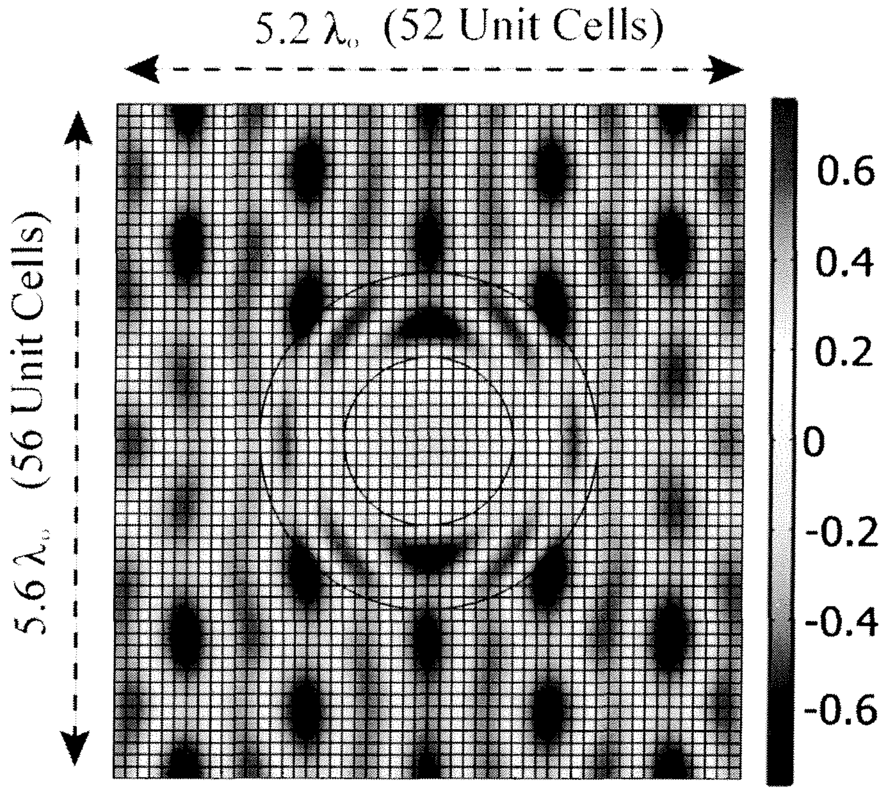
Figure 19:
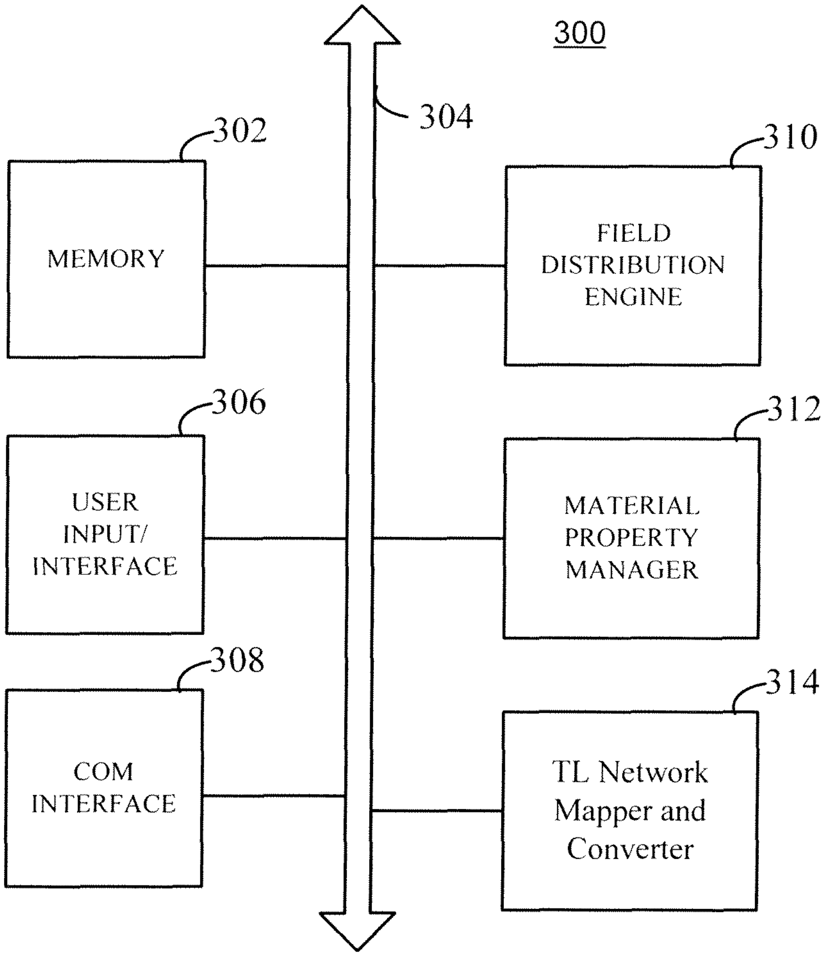

FIG. 15 is a circuit level depiction of a set up for simulating refraction between isotropic and anisotropic tensor TL metamaterials, in an example;

FIG. 16 is a contour plot of the voltage phase of a Bloch wave obliquely incident from an isotropic, homogenous TL metamaterial onto a tensor TL metamaterial;

FIG. 17 illustrates a simulation set up for a tensor transmission-line (TL) based cylindrical invisibility cloak embedded within isotropic, homogeneous TL medium;

FIG. 18 illustrates a time snapshot of the simulated, steady-state voltages within and surrounding the invisibility cloak of FIG. 17 implemented using tensor TL metamaterials; and FIG. 19 is a block diagram of an example converter machine for implementing the processes described herein.

While the disclosed methods and apparatus are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

Below are example techniques for designing TL metamaterials with arbitrary full tensors. The ability to create metamaterials with arbitrary material tensors is important to controlling and directing electromagnetic fields. The ability to realize tensor metamaterials such as those described herein allows for the development of novel devices derived through transformation optics [J. B. Pendry, D. Schurig, and D. R. Smith, "Controlling electromagnetic fields," *Science*, vol. 312, pp. 1780-1782, June 2006]. In transformation optics, the path of electromagnetic waves is controlled through the spatial variation of a medium's effective material parameters. Specifically, the change in electromagnetic field from an initial spatial distribution to a desired spatial distribution is recorded as a coordinate transformation. This coordinate transformation can then be directly related to a change in the permittivity and permeability of the underlying medium. The electromagnetic devices designed using transformation optics often consist of materials with full tensors that vary arbitrarily in space. As a result, the ability to design tensor metamaterials is important to the development of many novel devices from DC to optical frequencies.

To form various desired electromagnetic devices, a circuit approach is provided that directly maps material parameter distributions (of polarization-specific transformation-designed electromagnetic devices) to two-dimensional loaded transmission-line networks. For example, the tensor TL metamaterials herein combine microwave network theory (circuits) with transformation optics—a subject area that will be referred to as transformation circuits.

The present techniques allow one to control electromagnetic fields along a surface or radiating aperture. The resulting metamaterials, therefore, have uses across applications in particular in antenna design. Tensor TL metamaterials allow for the synthesis of arbitrary surface current distributions, which means arbitrary antenna aperture distributions. And because an antenna's far-field radiation pattern is a Fourier transform of its aperture distribution (current distribution), the present techniques will naturally allow the synthesis of planar/conformal antennas with fixed, arbitrary radiation patterns; antennas may be produced having arbitrary far-field patterns as a result. The inclusion of tunable reactive elements (e.g., diode-based or MEMs-based varactors) into the tensor TL metamaterials further enables arbitrarily configurable antenna apertures.

In addition to antenna applications, the tensor TL metamaterials (transformation circuits) may be used in the design of antenna feeds, beamforming networks, interconnects, multiplexers, power dividers, couplers and other electromagnetic devices. By combining the spatial field manipulation offered by transformation circuits with traditional filter concepts one may form wireless devices that provide both focusing/collimating and filtering functionality.

Figure 1:
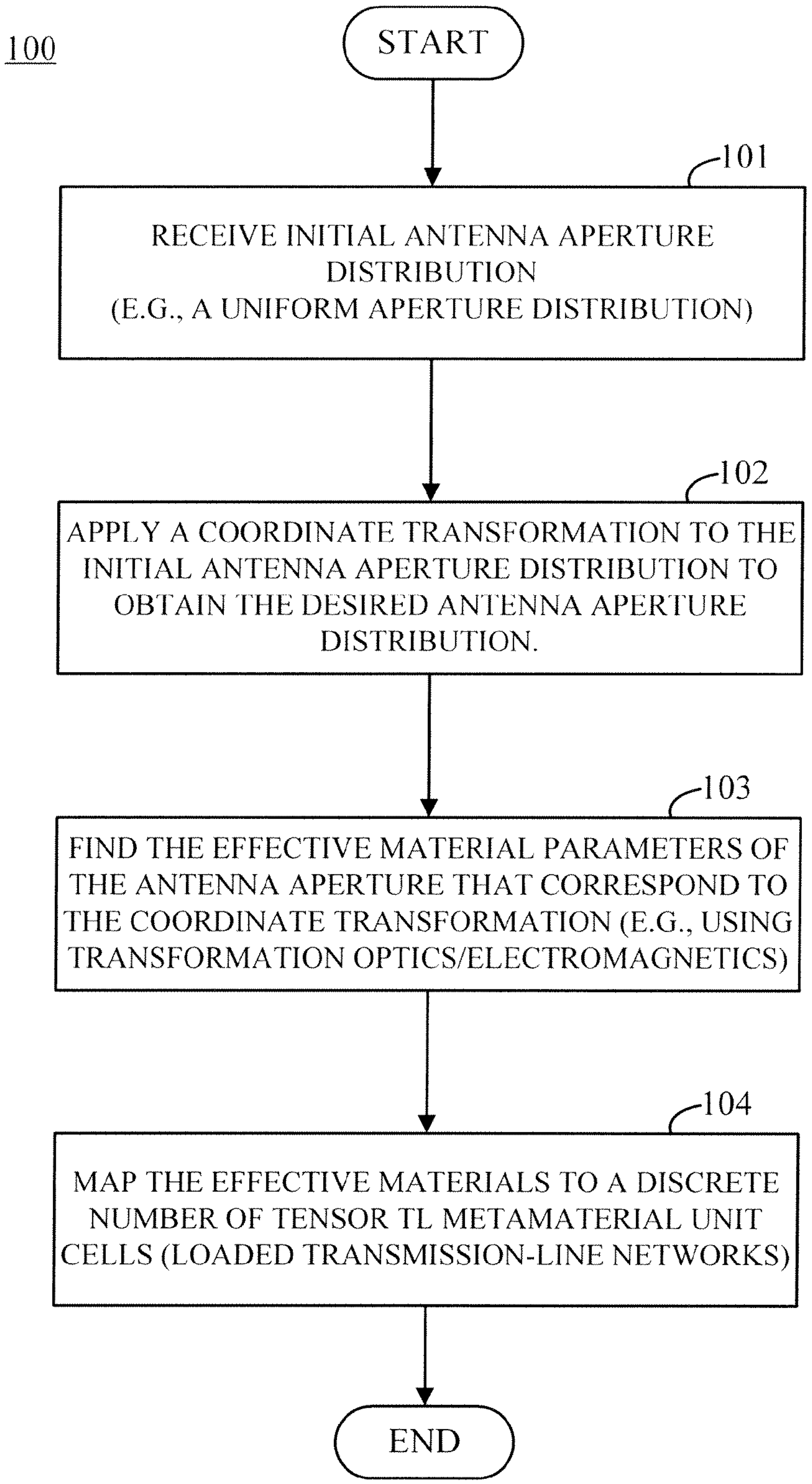
FIG. 1 illustrates an example process for forming an antenna designed through transformation optics/electromagnetics and implemented using tensor TL metamaterials, as described herein.

FIG. 1 Illustrates an example high level design process 100 for forming an antenna designed through transformation optics/electromagnetics and implemented using tensor TL metamaterials. At block 101, one starts with an initial aperture field distribution, for example a uniform aperture distribution. At block 102, a coordinate transformation is applied to the initial aperture distribution to obtain the desired aperture field distribution. At block 103, the effective material parameters of the antenna aperture are found that correspond to the coordinate transformation used. This may be accomplished by following the prescription outlined in [[J. B. Pendry, D. Schurig, and D. R. Smith, "Controlling electromagnetic fields," *Science*, vol. 312, pp. 1780-1782, June 2006]. At block 104, the effective material parameters of the antenna aperture are converted to discrete number of tensor TL metamaterial unit cells (loaded transmission-line networks) using the techniques described herein.

The various blocks, operations, and techniques described herein, including those of FIG. 1, may be implemented in a special-purpose machine for designing various optics and electromagnetic devices (e.g., antenna, beamforming networks, interconnects, multiplexers, power dividers, and couplers) by implementing the structures using tensor TL metamaterials. That machine may include at least one processor, a memory having stored thereon instructions that may be executed by that processor, an input device (such as a keyboard and mouse), and a display for depicting instructions and or characteristics of the device under design and/or the tensor TL metamaterials. Further, that machine may include a network interface to allow for wired/wireless communication of data to and from the machine, e.g., between the machine a separate machine or a separate storage medium. The blocks and operations herein may be executed in hardware, firmware, software, or any combination of hardware, firmware, and/or software. When implemented in software, the software may be stored in any computer readable memory within or accessed by the machine, such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. When implemented in hardware, the hardware may comprise one or more of discrete components, an integrated circuit, an application-specific integrated circuit (ASIC), etc.

Described below are example tensor TL unit cells that can be used to construct TL metamaterials capable of possessing arbitrary 2×2 permeability tensors and permittivity values for s-polarized electromagnetic radiation, and arbitrary 2×2 permittivity tensors and permeability values for p-polarized radiation. An analysis of a 2-branch TL metamaterial unit cell network is provided in FIG. 2; then a 3-branch TL metamaterial unit cell network (full 2×2 tensor) is provided in FIG. 5(*a*); and for greater flexibility a 4-branch TL metamaterial unit cell network is described in FIG. 6(*a*). The 4-branch metamaterial unit cell shows circuit elements along two orthogonal directions and each diagonal. The analysis shows that metamaterials may be designed with permeability or permittivity profiles that are tensors, meaning that no longer are transmission-line based metamaterials limited to having diagonal permeability and permittivity profiles in the Cartesian basis (a grid aligned with the rectangular unit cell dimensions).

The present techniques include the ability to represent and analyze transmission-line metamaterials using tensors. The techniques also allow for the design of transmission-line (TL) metamaterials with arbitrary 2×2 material tensors. While examples are discussed below of TL metamaterials based on a shunt node configuration, these techniques may be extended to series node transmission-line geometries as well, for example for p-polarized electromagnetic waves.

A tensor TL metamaterial represented by a diagonal tensor is shown in FIG. 2. This 2-branch structure is in general anisotropic since $Z_1$ and $Z_3$ may be different. Two different choices of unit cell for this TL metamaterial are shown in FIGS. 3*a* and 3*b*. FIG. 3*a* is the standard transmission-line metamaterial unit cell that has been proposed earlier [Negative *Refraction Metamaterials: Fundamental Principles and Applications*, G. V. Eleftheriades and K. G. Balmain, Eds. Hoboken, N.J.: Wiley-IEEE Press, 2005].

FIG. 3(*b*) illustrates a square unit cell, of dimension d, which can be represented by an impedance tensor $\overline{\overline{Z}}$ and a scalar admittance Y. The impedance tensor represents the series branches of the network, and the admittance represents the shunt branch of the network. The impedance tensor can be found by removing the shunt Y admittance and applying voltages $\Delta V_x$ and $\Delta V_y$ across the unit cell and solving for the net currents, $I_x$ and $I_y$, in the x and y directions, as shown in FIG. 4. Following this procedure, the following set of equations can be written for the net currents $$I_x = I_3 a + I_3 b = \frac{\Delta V_x}{2Z_3} \qquad (1)$$

$$I_y = I_1 a + I_1 b = \frac{\Delta V_y}{2Z_1}$$

These equations can be recast in the form of an admittance tensor $\overline{\overline{Y}}$ $$\overline{I} = \overline{\overline{Y}}\,\overline{V} = \begin{pmatrix} y_{xx} & y_{xy} \\ y_{yx} & y_{yy} \end{pmatrix}\begin{pmatrix} \Delta V_x \\ \Delta V_y \end{pmatrix} \qquad (2)$$

-continued $$= \begin{pmatrix} \frac{1}{2Z_3} & 0 \\ 0 & \frac{1}{2Z_1} \end{pmatrix} \begin{pmatrix} \Delta V_x \\ \Delta V_y \end{pmatrix}.$$

By taking the inverse of $\overline{\overline{Y}}$, the matrix equation can be expressed in terms of an impedance tensor $\overline{\overline{Z}}$ representing the series branches of the unit cell depicted in FIG. 3(*b*)

$$\overline{V} = \overline{\overline{Z}}\overline{I} = \begin{pmatrix} z_{xx} & z_{xy} \\ z_{yx} & z_{yy} \end{pmatrix} \begin{pmatrix} I_x \\ I_y \end{pmatrix} = \begin{pmatrix} 2Z_3 & 0 \\ 0 & 2Z_1 \end{pmatrix} \begin{pmatrix} I_x \\ I_y \end{pmatrix} \quad (3)$$

The tensor $\overline{\overline{Z}}$ and shunt admittance Y completely characterize the propagation characteristics along the TL metamaterial unit cell, when the phase delay/advance across the unit cell is small: $k_x d \ll 1$, $k_y d \ll 1$, where $k_x$ and $k_y$ are the wavenumbers in the x and y directions and d is the unit cell dimension. By deriving the two dimensional Telegrapher's equations and corresponding wave equations, the dispersion relation of the TL metamaterial shown in FIG. 3(*b*) can be found $$\frac{(k_x d)^2}{-2Z_3 Y} + \frac{(k_y d)^2}{-2Z_1 Y} = 1 \quad (4)$$

This dispersion equation can be rewritten in terms of the $\overline{\overline{Z}}$ tensor entries defined in (3)

$$\frac{(k_x d)^2}{-z_{xx} Y} + \frac{(k_y d)^2}{-z_{yy} Y} = 1. \quad (5)$$

The propagation characteristics of the network shown in FIG. 3(*b*) are analogous to those for an s-polarized wave (electric field polarized in the z direction) in a medium with the permeability tensor $\overline{\overline{\mu}}$ $$\overline{\overline{\mu}} = \begin{pmatrix} \mu_{xx} & 0 \\ 0 & \mu_{yy} \end{pmatrix} \quad (6)$$

and permittivity $\epsilon_z$ in the z direction. Such a medium yields the following dispersion equation $$\frac{(k_x)^2}{\omega^2 \mu_{yy} \varepsilon_z} + \frac{(k_y)^2}{\omega^2 \mu_{xx} \varepsilon_z} = 1 \quad (7)$$

which can be rewritten as $$\frac{(k_x d)^2}{\omega^2 \mu_{yy} d \varepsilon_z d} + \frac{(k_y d)^2}{\omega^2 \mu_{xx} d \varepsilon_z d} = 1 \quad (8)$$

Comparing Eqs. (5) and (8), one notices that there is a one-to-one relationship between a medium with material parameters $\overline{\overline{\mu}}$, $\epsilon_z$ and the electrical network shown in FIG. 3(*b*) with parameters $\overline{\overline{Z}}$, Y. Therefore, the following substitution can be applied to go from the effective material parameters needed to realize an electromagnetic device for s-polarized radiation to a two-dimensional circuit network:

$$j\omega \epsilon_z d \rightarrow Y$$

$$j\omega \mu_{yy} d \rightarrow z_{xx}$$

$$j\omega \mu_{xx} d \rightarrow z_{yy} \quad (9)$$

Both the anisotropic medium and its analogous electrical network possess diagonal tensors and exhibit dispersion curves that are ellipses or hyperbolas, depending on the signs of the permeabilities (impedances). The principal axes of the ellipses/hyperbolas are aligned with those of the coordinate system, since the tensor $\overline{\overline{Z}}$ is diagonal.

To design an example TL metamaterial with a full 2×2 $\overline{\overline{Z}}$ tensor, we considered the circuit shown in FIG. 5(*a*). In addition to having series impedances in the x and y directions, it also has a series impedance along the x-y diagonal. The diagonal impedances give rise to off-diagonal terms in the impedance tensor. To find the impedance tensor, the net currents in the x and y directions [see FIG. 5(*b*)] are found using the same procedure as before $$I_x = I_3 a + I_3 b + I_2$$

$$I_y = I_1 a + I_1 b + I_2 \quad (10)$$

The admittance tensor $\overline{\overline{Y}}$ can be derived using FIG. 5(*b*)

$$\overline{\overline{Y}} = \begin{pmatrix} y_{xx} & y_{xy} \\ y_{yx} & y_{yy} \end{pmatrix} = \begin{pmatrix} \frac{1}{2Z_2} + \frac{1}{2Z_3} & \frac{1}{2Z_2} \\ \frac{1}{2Z_2} & \frac{1}{2Z_2} + \frac{1}{2Z_1} \end{pmatrix} \quad (11)$$

The impedance tensor $\overline{\overline{Z}} = \overline{\overline{Y}}^{-1}$ representing the series branches of the network shown in FIG. 5(*a*), can also be found $$\overline{\overline{Z}} = \begin{pmatrix} z_{xx} & z_{xy} \\ z_{yx} & z_{yy} \end{pmatrix} = \begin{pmatrix} \frac{2Z_3(Z_1 + Z_2)}{Z_1 + Z_2 + Z_3} & \frac{-2Z_1 Z_3}{Z_1 + Z_2 + Z_3} \\ \frac{-2Z_1 Z_3}{Z_1 + Z_2 + Z_3} & \frac{2Z_1(Z_2 + Z_3)}{Z_1 + Z_2 + Z_3} \end{pmatrix} \quad (12)$$

The dispersion equation for the network becomes $$(k_x d)^2 \left( \frac{z_{yy}}{z_{xx} z_{yy} - z_{xy} z_{yx}} \right) - (k_x d)(k_y d) \frac{(z_{xy} + z_{yx})}{z_{xx} z_{yy} - z_{xy} z_{yx}} + (k_y d)^2 \left( \frac{z_{xx}}{z_{xx} z_{yy} - z_{xy} z_{yx}} \right) = -Y \quad (13)$$

Substituting Eq. (12) into Eq. (13) yields $$(k_x d)^2\left(\frac{1}{2Z_3}+\frac{1}{2Z_2}\right)+(k_x d)(k_y d)\left(\frac{1}{Z_2}\right)+(k_y d)^2\left(\frac{1}{2Z_1}+\frac{1}{2Z_2}\right)=-Y \tag{14}$$

Propagation along the network depicted in FIG. 5(*a*) can be related to s-polarized (z-directed electric field polarization) propagation within an anisotropic medium with a full 2×2 permeability tensor $$\bar{\bar{\mu}}=\begin{pmatrix}\mu_{xx} & \mu_{xy}\\ \mu_{yx} & \mu_{yy}\end{pmatrix} \tag{15}$$

and permittivity $\in_z$ in the z direction. The dispersion equation of such a medium is $$(k_x)^2\frac{1}{\omega^2}\left(\frac{\mu_{xx}}{\mu_{xx}\mu_{yy}-\mu_{xy}^2}\right)+\frac{(k_x)(k_y)}{\omega^2}\left(\frac{\mu_{xy}+\mu_{yx}}{\mu_{xx}\mu_{yy}-\mu_{xy}^2}\right)+(k_y)^2\frac{1}{\omega^2}\left(\frac{\mu_{yy}}{\mu_{xx}\mu_{yy}-\mu_{xy}^2}\right)=\varepsilon_z \tag{16}$$

In order to go from the effective medium Eq. (16) to the electrical network Eq. (13), the following substitutions are required $$j\omega\mu_{xy}d\rightarrow -z_{xy}$$

$$j\omega\mu_{yx}d\rightarrow -z_{yx} \tag{17}$$

in addition to those given by Eq. (9). A different choice of tensor TL metamaterial unit cell with 3 branches (one diagonal impedance), which also possesses a full 2×2 $\bar{\bar{Z}}$ tensor is shown in FIG. 5(*c*). A similar analysis can be performed on it as well.

The present techniques may also be applied to more complex TL metamaterials where circuit elements appear along both diagonals of the unit cell or are meandered within the unit cell. To represent even greater design flexibility, for example, FIG. 6(*a*) shows a network that has impedances along both diagonals of the unit cell. To derive the $\bar{\bar{Y}}$ tensor, the net currents in the x and y directions are found once again [see FIG. 6(*b*)]

$$\begin{aligned}I_x&=I_{3a}+I_{3b}+I_{2a}+I_{4a}\\&=I_{3a}+I_{3b}+I_{2b}+I_{4b}\\I_y&=I_{1a}+I_{1b}+I_{2a}-I_{4b}\\&=I_{1a}+I_{1b}+I_{2b}-I_{4a}\end{aligned} \tag{18}$$

From these equations, the following admittance tensor $\bar{\bar{Y}}$ can be derived for the TL metamaterial shown in FIG. 6(*a*)

$$\bar{\bar{Y}}=\begin{pmatrix}\frac{1}{2Z_2}+\frac{1}{2Z_3}+\frac{1}{2Z_4} & \frac{1}{2Z_2}-\frac{1}{2Z_4}\\ \frac{1}{2Z_2}-\frac{1}{2Z_4} & \frac{1}{2Z_1}+\frac{1}{2Z_2}+\frac{1}{2Z_4}\end{pmatrix} \tag{19}$$

The corresponding impedance tensor $\bar{\bar{Z}}=\bar{\bar{Y}}^{-1}$ is $$\bar{\bar{Z}}=\begin{pmatrix}Z_{xx} & Z_{xy}\\ Z_{yx} & Z_{yy}\end{pmatrix}=\begin{pmatrix}\frac{2Z_3(Z_1Z_2+Z_1Z_4+Z_2Z_4)}{Z_D} & \frac{2Z_1Z_3(Z_2-Z_4)}{Z_D}\\ \frac{2Z_1Z_3(Z_2-Z_4)}{Z_D} & \frac{2Z_1(Z_2Z_3+Z_2Z_4+Z_3Z_4)}{Z_D}\end{pmatrix} \tag{20}$$

where $$Z_D=Z_1Z_2+4Z_1Z_3+Z_1Z_4+Z_2Z_3+Z_2Z_4+Z_3Z_4 \tag{21}$$

The dispersion equation of the TL metamaterial shown in FIG. 6(*a*) can be found by substituting the $\bar{\bar{Z}}$ tensor entries from Eq. (20) into Eq. (13)

$$(k_x d)^2\left(\frac{1}{2Z_3}+\frac{1}{2Z_2}+\frac{1}{2Z_4}\right)+(k_x d)(k_y d)\left(\frac{1}{Z_2}-\frac{1}{Z_4}\right)+(k_y d)^2\left(\frac{1}{2Z_1}+\frac{1}{2Z_2}+\frac{1}{2Z_4}\right)=-Y \tag{22}$$

It should be noted that impedances on the y=x diagonal appear as positive entries in the $\bar{\bar{Z}}$ tensor; while those on the y=−x diagonal appear as negative entries. Therefore, depending on the desired frequency dependence of the parameters, one may want to choose an impedance on one diagonal as opposed to the other. For example, at a certain frequency of operation, an inductance on the y=x diagonal can be chosen to give the same $z_{xy}$ or $z_{yx}$ entry as capacitance on the y=−x diagonal. The resulting frequency variation of the two choices, however, would be quite different: ω vs. 1/ω.

The diagonal impedances ($Z_2$ and $Z_4$) lead to off-diagonal tensor impedance elements ($Z_{xy}$ and $Z_{yx}$). These diagonal impedances allow a net current in one direction (for example, $I_x$, which is representative of magnetic field intensity component $H_y$) to give rise to series voltage drops in both the x and y directions ($V_x$ and $V_y$, which are proportional to the magnetic flux density components $B_y$ and $B_x$). Therefore, by properly selecting the values of $Z_1$, $Z_2$, $Z_3$, and $Z_4$, one can design a metamaterial with arbitrary magnetic anisotropy (2×2μ tensor) and permittivity constant. A different choice of tensor TL metamaterial unit cell with four branches (two diagonal impedances), which also possesses a full 2×2 $\bar{\bar{Z}}$ tensor is shown in FIG. 6(*c*). A similar analysis can be performed on it as well.

For the foregoing analysis, it was assumed that there was very little, if any, spatial dispersion (i.e., phase delays) across the unit cell in the x and y directions. To derive accurate dispersion equations that take into account spatial dispersion, a Bloch analysis of the TL metamaterial shown in FIG. 6(*a*) was performed. Bloch analysis is only performed on the TL metamaterial in FIG. 6(*a*), because the dispersion equations for the unit cells in FIGS. 3(*b*) and 5(*a*) can be derived from it.

An infinite structure having the unit cells depicted in FIG. 6(*a*) can be analyzed by applying Bloch boundary conditions to the voltages at the edges of the unit cell. As shown in FIG. 7, the voltages across the unit cell can be related to each other by the Bloch wavenumbers $k_x$ and $k_y$. Once the voltages are assigned in this manner, the currents on the branches of the unit cell may be written in terms of $Z_1$, $Z_2$, $Z_3$, $Z_4$, $k_xd$ and $k_yd$ $$I_{1a}=\frac{V(1-e^{-jk_xd}}{4Z_1}\quad I_{1b}=\frac{Ve^{-jk_xd}(1-e^{-jk_yd}}{4Z_1}\tag{23}$$

$$I_{3a}=\frac{V(1-e^{-jk_xd}}{4Z_3}\quad I_{3b}=\frac{Ve^{-jk_yd}(1-e^{-jk_xd}}{4Z_3}$$

$$I_{2a}=\frac{V(Z_4-Z_2(e^{-jk_xd}+e^{-jk_yd})2Z_2-Z_4e^{-j\gamma})}{2Z_2(Z_2+Z_4)}$$

$$I_{2b}=\frac{V(Z_4+Z_2(e^{-jk_xd}+e^{-jk_yd})2Z_2e^{-j\gamma}-Z_4e^{-j\gamma})}{2Z_2(Z_2+Z_4)}$$

$$I_{4a}=\frac{V(-Z_4-Z_2(e^{-jk_xd}+e^{-jk_yd})2Z_2e^{-jk_xd}-Z_4e^{-j\gamma})}{2Z_4(Z_2+Z_4)}$$

$$I_{4b}=\frac{V(Z_4-Z_2(e^{-jk_xd}+e^{-jk_yd})2Z_4e^{-jk_xd}-Z_4e^{-j\gamma})}{2Z_4(Z_2+Z_4)}$$

where $$\gamma=k_xd=k_yd.\tag{24}$$

Applying Kirchhoff's Current Law (KCL) to a node where four neighboring unit cells intersect yields the following equation $$\begin{aligned}&I_{1a}e^{-jk_xd}+I_{1b}+I_{3a}e^{-jk_yd}+I_{3b}+\\&\quad I_{2b}+I_{4b}e^{-jk_yd}-(I_{1b}e^{-jk_yd}+I_{1a}e^{-j\gamma}+I_{2a}e^{-j\gamma}+\\&\qquad I_{3a}e^{-j\gamma}+I_{3b}e^{-jk_xd}+I_{4a}e^{-jk_xd}+4I_Ye^{-j\gamma})=0\end{aligned}\tag{25}$$

where $$I_y=\frac{VY}{4}\tag{26}$$

By substituting the current expressions from Eq. (23) and Eq. (24) into Eq. (25), the exact dispersion equation is obtained $$\begin{aligned}&\left(\frac{4}{Z_2+Z_4}+\frac{2}{Z_3}\right)\sin^2\left(\frac{k_xd}{2}\right)+\left(\frac{2Z_4}{Z_2(Z_2+Z_4)}\right)\sin^2\left(\frac{\lambda}{2}\right)+\\&\quad\left(\frac{2Z_2}{Z_4(Z_2+Z_4)}\right)\sin^2\left(\frac{\zeta}{2}\right)+\left(\frac{4}{Z_2+Z_4}+\frac{2}{Z_1}\right)\sin^2\left(\frac{k_yd}{2}\right)=-Y\end{aligned}\tag{27}$$

where $$\gamma=k_xd+k_yd\qquad\zeta=k_xd-k_yd.\tag{28}$$

For the frequency range where the per-unit-cell phase delays are small ($k_xd<<1$, $k_yd<<1$), the periodic network can be considered as an effective medium. Under these conditions, the dispersion equation Eq. (27) simplifies to Eq. (22) obtained using the approximate tensor analysis.

Next, the impedances needed to terminate Bloch waves in finite tensor TL metamaterials having the unit cells shown in FIG. 7 are found. The terminations are derived for a Bloch wave defined by a specific wavevector: ($k_x$, $k_y$).

The four nodes (corners) of the unit cell shown in FIG. 7 have been labeled A, B, C and D. The currents out of the nodes are named $I_A$, $I_B$, $I_C$, and $I_D$, respectively. The current out of each node can be expressed in terms of the currents defined by Eqs. (23) and (24) as follows $$I_A=-(I_{1a}+I_{2a}+I_{3a}+I_Y)$$

$$I_B=-(I_{1b}-I_{3a}-I_{4b}+I_Ye^{-jk_xd})$$

$$I_C=-(-I_{1a}+I_{3b}+I_{4a}+I_Ye^{-jk_xd})$$

$$I_D=-(-I_{1b}-I_{2b}-I_{3b}+I_Ye^{-jk_xd-jk_yd})\tag{29}$$

The Bloch impedances $Z_A$, $Z_B$, $Z_D$, and $Z_D$ seen out of these nodes can then be computed by taking the ratio of the node voltage to the current out of the node $$Z_A=\frac{V}{I_A}\qquad Z_B=\frac{Ve^{-jdk_xd}}{I_B}\tag{30}$$

$$Z_C=\frac{Ve^{-jk_yd}}{I_C}\qquad Z_D=\frac{Ve^{-jk_xd-jk_yd}}{I_D}$$

These impedances represent the impedances needed to terminate the unit cell in order to eliminate reflections (reflected Bloch waves) at its terminals (corners). In effect, these terminations make the TL metamaterial appear as if it were infinite in extent under a Bloch wave excitation. Since the currents $I_A$, $I_B$, $I_C$ and $I_D$ are defined out of the nodes for a specific Bloch wave characterized by the wavevector ($k_x$, $k_y$), some of the Bloch impedances may have negative real parts. This simply means that the actual current flows in the opposite direction.

The proposed tensor TL metamaterials can be implemented as loaded 2D TL networks. FIG. 8 depicts a practical realization of the tensor TL metamaterial shown in FIG. 6(*a*). As shown in FIG. 8, printed microstrip lines are loaded with both series and shunt elements. In this example, the substrate was assumed to be lossless and to have a relative permittivity of $\epsilon_r=3$ and height h=1.524 mm. The width ω of the lossless metallic microstrip lines is 0.4 mm, and the unit cell dimension d=8.4 mm.

A lumped element representation of the metamaterial depicted in FIG. 8, which takes into account the TL inductance and capacitance in addition to the loading elements, is shown in FIG. 9. In the figure, the series loading elements are assumed to be inductors and the shunt loading element is assumed to be a capacitor. The variables—$L_{l1}$, $L_{l2}$, $L_{l3}$, and $L_{l4}$—represent the series loading inductances, whereas $L_{TL}$ denotes the inductance of the interconnecting microstrip lines. The capacitance $C_{tot}$ represents the sum of the transmission-line capacitance $C_{TL}$ and the additional loading capacitance $C_l$. The variables $C_{TL}$ and $L_{TL}$ may be expressed in terms of $L_0$ and $C_0$ (the per-unit-length inductance and capacitance of the interconnecting transmission lines) as follows: $L_{TL}=L_0d/2$ and $C_{tot}=C_{TL}+C_l$, $C_{TL}=2C_0d(1+\sqrt{2})$.

The values of $L_0$ and $C_0$ can be extracted from the unloaded microstrip grid's Bloch impedance and per-unit-cell phase delay. A unit cell of the unloaded microstrip grid is depicted in FIG. 10, while its lumped element circuit model is shown in FIG. 11. Expressions for the Bloch impedance $Z_B$ and Bloch wavenumber $k_B$ of the unit cell shown in FIG. 11 can be easily derived for on-axis propagation. For frequencies of operation where the cell's dimensions are electrically short, they can be expressed as $$k_B=\omega\sqrt{2L_0C_0}\tag{31}$$

$$Z_B=\sqrt{\frac{L_0}{C_0}}\frac{1}{2+\sqrt{2}}$$

The Bloch wavenumber and impedance for on-axis propagation can also be expressed in terms of the unit cell's Z-parameters ($Z_{11}$, $Z_{12}$, $Z_{21}$, $Z_{22}$) obtained from on-axis scattering simulations on one unit cell of the unloaded microstrip grid $$k_B d = \arccos\left(\frac{Z_{11}}{Z_{12}}\right) \quad (32)$$

$$Z_B = \sqrt{Z_{11}Z_{22} - Z_{12}Z_{21}}.$$

From full-wave simulation, the Z-parameters of the unloaded TL grid shown in FIG. 10 were found to be $$\begin{pmatrix} Z_{11} & Z_{12} \\ Z_{21} & Z_{22} \end{pmatrix} = -j\begin{pmatrix} 171.03 & 181.66 \\ 181.66 & 171.02 \end{pmatrix} \quad (33)$$

Using these Z-parameters and Eq. (32), $Z_B$ and $k_Bd$ for the unloaded grid were calculated to be $$k_B d = 0.344 \text{ rad}$$

$$Z_B = 61.244\Omega \quad (34)$$

The Bloch wavenumber, Bloch impedance, and Eq. (31) were then used to extract the following circuit parameters:

$$L_0 d = 8.090 \text{ nH}$$

$$C_0 d = 0.185 \text{ pF} \quad (35)$$

These circuit parameters completely characterize the unloaded TL grid at frequencies where the phase delays across it are electrically small: $k_xd<<1$ and $k_yd<<1$.

The analytical dispersion for tensor TL metamaterials was verified through three separate full-wave simulations. The three examples consider the proposed metamaterial unit cell (shown in FIG. 8) with different sets of loading elements.

In the dispersion simulations, periodic (Bloch) boundary conditions were defined on the unit cell faces with normal unit vectors $\hat{x}$ and $\hat{y}$. A perfectly matched layer was placed at a distance seven times the substrate height above the microstrip lines in order to represent infinite free space above the metamaterial. The full-wave eigenmode solver was then used to compute the isofrequency contours of the structure.

First, a simulation was performed of an unloaded unit cell shown in FIG. 10. At low frequencies, the infinite medium formed of these unit cells would be expected to be isotropic and homogeneous with isofrequency contours that are concentric circles. FIG. 12(*a*) shows the isofrequency contours computed using the commercial full-wave eigenmode solver (HFSS); and FIG. 12(*b*) compares them to those obtained analytically. The analytical isofrequency contours were determined by substituting the following values:

$$Z_1 = j\omega L_{TL}$$

$$Z_2 = j\omega L_{TL}\sqrt{2}$$

$$Z_3 = j\omega L_{TL}$$

$$Z_4 = j\omega L_{TL}\sqrt{2}$$

$$Y = j\omega C_{tot} = j\omega C_{TL} \quad (36)$$

into the derived dispersion Eq. (22).

In the second example, the microstrip TL grid was loaded with the following series inductive elements (see FIG. 9):

$$L_{l1} = 4 \text{ nH}, L_{l2} = 2 \text{ nH}, L_{l3} = 16 \text{ nH}, L_{l4} = 12 \text{ nH} \quad (37)$$

The impedances and admittance of this tensor TL metamaterial are:

$$Z_1 = j\omega(L_{TL} + L_{l1})$$

$$Z_2 = j\omega(L_{TL}\sqrt{2} + L_{l2})$$

$$Z_3 = j\omega(L_{TL} + L_{l3})$$

$$Z_4 = j\omega(L_{TL}\sqrt{2} + L_{l4})$$

$$Y = j\omega C_{tot} = j\omega C_{TL} \quad (38)$$

The analogous magnetically anisotropic medium, given by Eqs. (9), (17), and (20), has the following material parameters: $\epsilon = 12.01\epsilon_0$ and $$\begin{pmatrix} \mu_{xx} & \mu_{xy} \\ \mu_{yx} & \mu_{yy} \end{pmatrix} \Rightarrow \begin{pmatrix} 0.66 & 0.21 \\ 0.21 & 0.87 \end{pmatrix}\mu_0 \quad (39)$$

The metamaterial and its analogous medium are anisotropic and have elliptical isofrequency contours with a negative tilt angle of approximately −32° from the x-axis. The isofrequency contours obtained through full-wave simulations and those derived analytically using Eq. (22) are compared in FIGS. 13(*a*) and 13(*b*) and show close agreement.

The third example considers adding shunt capacitive loading elements in addition to series inductive elements. By loading the structure with a shunt capacitance, the effective permittivity of the medium is increased over that of the unloaded grid. A shunt capacitance $C_l = 0.4$ pF was added to the intrinsic capacitance of the microstrip TLs $C_{TL}$ to yield $$Y = j\omega C_{tot} = j\omega(C_{TL} + C_l). \quad (40)$$

The series inductive elements were chosen to be $$L_{l1} = 4 \text{ nH}, L_{l2} = 12 \text{ nH}, L_{l3} = 16 \text{ nH}, L_{l4} = 2 \text{ nH} \quad (41)$$

This set of inductive elements is different from that given by Eq. (37). The values of $L_{l2}$ and $L_{l4}$ have been swapped in order to produce a positive tilt angle in the isofrequency contours. This sign change in tilt angle can be easily predicted from Eq. (22). The simulated (see FIG. 14(*a*)) and analytical isofrequency contours are compared in FIG. 14(*b*). Once again, close agreement is observed between the simulated and analytically derived isofrequency contours. It should be noted that elliptical isofrequency contours are wider in FIG. 14(*b*) than in FIG. 13(*b*) due to the increase in effective permittivity of the medium. This final example shows that not only can the magnetic 2×2 tensor of the metamaterial be manipulated with series loading elements, but its effective permittivity can also be tailored using shunt loading elements.

The above techniques were applied to design two separate example structures (electromagnetic devices) employing tensor TL metamaterials. This was done in order to show the utility of tensor TL metamaterials and the extreme control of electromagnetic fields they can provide. The first example considers refraction from an isotropic TL metamaterial to a tensor TL metamaterial. The above analysis, in particular, the one-to-one relationship between tensor material parameters and circuit quantities given by Eq. (9) and (17), allowed us to design two media that are impedance matched to each other. The second example considers the design of a cylindrical invisibility cloak embedded within an isotropic TL metamaterial. The cylindrical invisibility cloak is an annulus which renders anything placed inside it invisible to an outside observer, within a given frequency range. These two examples demonstrate the ability of tensor TL metamaterials to manipulate electromagnetic waves in unusual and extreme ways.

For the first example, the refraction example, the isotropic and anisotropic TL metamaterials referred to as medium 1 and medium 2, respectively, were designed as follows. Medium 1 was implemented using the unit cell shown in FIG.

3(*b*); whereas medium 2 was implemented using the unit cell depicted in FIG. 5(*a*). The operating frequency was chosen to be 1.0 GHz. The unit cells of the media were assumed to have a cell dimension of d=8.4 mm, which corresponds to 0.028 free-space wavelengths at the frequency of operation. In this example, we assumed that the wave in medium 1 is incident at an angle of θ=30° with respect to the normal.

Medium 1 is an isotropic medium with material parameters $$\mu=2\mu_0 \in=1\in_0 \qquad (42)$$

The second medium is chosen to be anisotropic with the following permeability tensor $$\bar{\bar{\mu}} = \begin{pmatrix} \mu_{xx} & \mu_{xy} \\ \mu_{yx} & \mu_{yy} \end{pmatrix} = \mu_0 \begin{pmatrix} 1.5 & -1.3540064 \\ -1.3540064 & 3.0 \end{pmatrix} \qquad (43)$$

and permittivity $\in=1\in_0$. This particular anisotropic medium was chosen since it is impedance matched to medium 1, for the particular angle of incidence considered. It should be noted that this tensor medium is only one of an infinite number of possibilities that can be impedance matched at the specified angle of incidence. According to anisotropic media theory, the refracted angle in medium 2 should be 22.27°.

Given the unit cell dimension d, frequency of operation and the network equivalence stipulated by Eqs. (9) and (17), medium 1 corresponds to TL metamaterial shown in FIG. 3(*b*) with lumped element values $$L_1=10.55575132 \text{ nH}, L_3=10.55575132 \text{ nH}$$

$$C=0.07437518 \text{ pF} \qquad (44)$$

where $$Z_1=j\omega L_1,\ Z_3=j\omega L_3,\ Y=j\omega C. \qquad (45)$$

Once again, applying the substitutions given by Eqs. (9) and (17) to the material parameters given by Eq. (43), medium 2 corresponds to the TL metamaterial shown in FIG. 5(*a*) with the following electrical parameters $$L_1 = 3.23250216\ nH,\quad L_2 = 10.39458534\ nH \qquad (46)$$
$$L_3 = 4.93143081\ nH \quad C = 0.07437518 \text{ pF}$$

where $$Z_1 = j\omega L_1,\ Z_2 j\omega L_2,\ Z_3 = j\omega L_3,\ Y = j\omega C. \qquad (47)$$

The angle of incidence and the phase matching condition along the interface between the two TL metamaterials stipulate per-unit-cell phase delays (rad) in medium 1 and medium 2 to be $k_{x1}$d=0.21561754, $k_{y1}$d=0.12448684 and $k_{x2}$d=0.30403069, respectively.

Refraction at the interface between these two TL metamaterials was simulated using Agilent's Advanced Design System (ADS) circuit simulator. Each metamaterial extended two unit cells in the x direction and four unit cells in the y direction. Therefore, the overall simulated structure was four by four unit cells, as shown in FIG. 15. The plane wave incident from medium 1 was generated using an array of linearly phased voltage sources along boundaries B and C, as shown in FIG. 15. A phased voltage source was also needed along boundary D, in order to eliminate the shadow along boundary D resulting from the finite interface. The source impedances (boundaries B, C and D) and termination impedances (remaining boundaries) were found using the techniques outlined above. In other words, the edges of the overall structure were terminated to emulate refraction between two semi-infinite media.

A contour plot of the simulated voltage phases sampled at the corners of the unit cells in both TL metamaterials is shown in FIG. 16. The plot clearly shows an incident wave and refracted wave at the predicted angles. These results verify the dispersion equations and termination expressions discussed above, as well as the equivalence between effective medium theory and network theory given by Eqs. (9) and (17).

For the second example, we modeled a cylindrical invisibility cloak using tensor TL metamaterials, as shown in FIG. 17. The inner and outer radii of the cloak are denoted $R_1$ and $R_2$, respectively. The material parameters of the cylindrical cloak 200 are taken for the specific case of s-polarized radiation (z-directed electric field)

$$\mu_r = \frac{r-R_1}{r}\mu_\varphi = \frac{r}{r-R_1}\varepsilon_z = \left(\frac{R_2}{R_2-R_1}\right)^2\frac{r-R_1}{r} \qquad (48)$$

In the Cartesian system, this translates to $$\begin{aligned} \mu_{xx} &= \mu_r\cos^2\varphi + \mu_\varphi\sin^2\varphi \\ \mu_{xy} &= \mu_{yx} = (\mu_r - \mu_\varphi)(\cos\varphi)\sin\varphi \\ \mu_{yy} &= \mu_r\sin^2\varphi + \mu_\varphi\cos^2\varphi \\ \varepsilon_z &= \left(\frac{R_2}{R_2-R_1}\right)^2\frac{r-R_1}{r} \end{aligned} \qquad (49)$$

Medium 202 surrounding the cloak 200 is assumed to be isotropic and homogeneous: $\in=\in_0$ and $\mu=\mu_0$. An operating frequency of 3.56896 GHz was selected along with radii of $R_1=0.7\lambda_0$ and $R_2=1.4\lambda_0$. To implement the cloak using tensor TL metamaterials, the substitutions given by Eqs. (9) and (17) were applied to the material parameters of the cloak 200 and surrounding medium 202. The unit cell depicted in FIG. 5(*a*) was used to design the lower right quadrant of the cloak 200. The remaining three quadrants were generated by mirroring the original quadrant along the x or y axes. The medium within 202 and surrounding the cloak 200 was implemented using the unit cell of FIG. 3(*b*). The dimensions of each unit cell were assumed to be 8.4 mm ($\lambda_0$/10 at 3.56896 GHz). The cloak 200 and surrounding space 202 were discretized according to FIG. 17, and the material parameters were defined with respect to the center of each unit cell. Each square 204 in FIG. 17 represents a unit cell. The 460 unit cells 204 that constitute the cloak 200 are identified with dots in order to distinguish them from the surrounding medium.

In the simulation, the left-hand side of the entire structure 206 was excited with in-phase voltage sources in order to generate a plane wave incident from left to right. The voltage sources, as well as the right-hand side of the structure 206, were terminated in accordance with the descriptions above to emulate an infinite medium. The top and bottom edges of the simulated structure were open-circuited, as would be the case for a plane wave incident from left to right. As in the previous example, the voltages at the edges of each unit cell 204 were computed using the Agilent ADS circuit simulator. A time snapshot of the steady-state voltages is plotted in FIG. 18. Some reflections to the left of the cloak 200 and a slight shadow to the right of the cloak 200 are observed resulting from the cloak's discretization. Nevertheless, the field patterns characteristic of a cloak are quite prominent.

The metamaterials herein may be implemented through TL tensor networks operable at radio frequency, microwave or millimeter wave frequencies, e.g., using lumped or distributed circuit elements. In other examples, these TL tensor networks may be operate at or above terahertz frequencies, e.g., using nano-circuit elements, including nano-inductors and nano-capacitors. The nano-inductors may be plasmonic nano-particles, for example, and the nano-capacitors may be dielectric nano-particles. More generally, the TL tensor networks may be formed of a two-dimensional network of reactive and/or resistive elements as demonstrated herein.

FIG. 19 illustrates components of an example machine 300 for implementing the techniques described herein. The machine includes a memory 302 for storing data such as desired electromagnetic devices (and attendant parameters) that are to be formed of TL tensor metamaterials. The memory 302 is coupled to a system bus 304 for transmitting data to and receiving data from other functional elements in the machine 300, including software, firmware, and hardware elements, as described herein. An input device and interface 306 is also shown and used for obtaining user specified data; and a communication interface 308 is provided for coupling the machine 300 to an external machine, processor, etc.

A field distribution engine 310 collects information on a desired electromagnetic field distribution for a desired device to be fabricated. In some examples, the field distribution engine 310 will apply a coordinate transformation to an initial base field distribution to obtain the desired distribution of the device. The desired field distribution data is provided to a material property manager 312 that may determine the effective material parameters (e.g., permeability and permittivity) needed to achieve the desired field distribution for a specific excitation. A transmission-line network mapper and converter 314 then takes the material parameters data from the manager 312 and maps it to an electrical network (e.g., a two-dimensional electrical network formed of impedance and admittance values), which is then converted to a tensor TL metamaterial (e.g., a loaded two-dimensional transmission-line network) having the desired material properties (e.g., permeability and permittivity). The formed metamaterial, when excited, will produce the desired field distribution.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed is:

1. A method for forming an electromagnetic metamaterial with arbitrary material permittivity and/or permeability tensors, the method comprising:

directly mapping, using a converter machine, a material described by a 2×2 effective permeability tensor and permittivity constant, or by a 2×2 effective permittivity tensor and permeability constant, to a two-dimensional electrical network described by an impedance tensor and scalar admittance, or an admittance tensor and a scalar impedance; and converting, using the converter machine, the two-dimensional electrical network to a two-dimensional loaded transmission-line network, wherein the metamaterial comprising the loaded transmission-line network is such that when excited with a specified excitation the metamaterial produces a desired electromagnetic field distribution.

2. The method of claim 1, wherein the metamaterial comprises a plurality of unit cells that act as an isotropic medium with the 2×2 effective permeability tensor and permittivity constant.

3. The method of claim 2, wherein each of the plurality of unit cells is for s-polarized radiation and has a shunt node transmission-line topology.

4. The method of claim 3, wherein each of the plurality of unit cells has one shunt impedance, two orthogonal series impedances and one or two diagonal series impedances, wherein the shunt impedance results in an effective permittivity, wherein the two orthogonal series impedances and one or two diagonal series impedances result in the 2×2 effective permeability tensor.

5. The method of claim 1, wherein the metamaterial comprises a plurality of unit cells that act as an anisotropic medium with the 2×2 effective permeability tensor and permittivity constant.

6. The method of claim 5, wherein each of the plurality of unit cells is for s-polarized radiation and has a shunt node transmission-line topology.

7. The method of claim 6, wherein each of the plurality of unit cells has one shunt impedance, two orthogonal series impedances and one or two diagonal series impedances, wherein the shunt impedance results in an effective permittivity, wherein the two orthogonal series impedances and one or two diagonal series impedances result in the 2×2 effective permeability tensor.

8. The method of claim 1, wherein the metamaterial comprises a plurality of unit cells that act as an isotropic medium with the 2×2 effective permittivity tensor and permeability constant.

9. The method of claim 8, wherein each of the plurality of unit cells is for p-polarized radiation and has a series node transmission-line topology.

10. The method of claim 9, wherein each of the plurality of unit cells has one series impedance, two orthogonal shunt admittances and one or two diagonal shunt admittances, wherein the series impedance results in an effective permeability, wherein the two orthogonal shunt admittances and one or two diagonal shunt admittances result in a 2×2 material tensor.

11. The method of claim 1, wherein the metamaterial comprises a plurality of unit cells that act as an each an anisotropic medium with the 2×2 effective permittivity tensor and permeability constant.

12. The method of claim 11, wherein each of the plurality of unit cells is for p-polarized radiation and has a series node transmission-line topology.

13. The method of claim 12, wherein each of the plurality of unit cells has one series impedance, two orthogonal shunt admittances and one or two diagonal shunt admittances, wherein the series impedance results in an effective permeability, wherein the two orthogonal shunt admittances and one or two diagonal shunt admittances result in a 2×2 material tensor.

14. The method of claim 1, wherein material parameters are determined for the two-dimensional tensor transmission-line network.

15. The method of claim 1, wherein the two-dimensional transmission-line network is implemented at radio frequency, microwave or millimeter wave frequencies using lumped or distributed circuit elements.

16. The method of claim 1, wherein the two-dimensional transmission-line network is implemented at or above tera-hertz frequencies using nano-circuit elements, including nano-inductors and nano-capacitors.

17. The method of claim 16, wherein the nano-inductors are plasmonic nano-particles.

18. The method of claim 16, wherein the nano-capacitors are dielectric nano-particles.

19. The method of claim 1, wherein the two-dimensional transmission-line network is a two dimensional network of reactive and resistive elements.

20. The method of claim 1, wherein the two-dimensional tensor transmission-line network is a two dimensional host transmission-line loaded with reactive elements.

21. A method for forming electromagnetic metamaterials with arbitrary material permittivity and/or permeability tensors using loaded transmission-line networks, the method comprising:

selecting a desired electromagnetic field distribution;

determining, using a material property manager ermine of a converter machine, the effective material parameters needed to achieve the desired electromagnetic field distribution for a specific excitation; and mapping, using a transmission-line network mapper of the converter machine, the effective material parameters to a two-dimensional loaded transmission network forming a tensor transmission-line (TL) metamaterial, such that when excited the electromagnetic metamaterial produces the desired electromagnetic field distribution.

* * * * *

UNITED STATES PATENT AND TRADEMARK OFFICE

CERTIFICATE OF CORRECTION

PATENT NO. : 8,490,035 B2
APPLICATION NO. : 12/945798
DATED : July 16, 2013
INVENTOR(S) : Grbic et al.

It is certified that error appears in the above-identified patent and that said Letters Patent is hereby corrected as shown below:

In The Claims

In Column 20, Line 7, in Claim 21, delete "ermine" and insert -- engine --, therefor.

Signed and Sealed this
Third Day of February, 2015

Michelle K. Lee

Michelle K. Lee
*Deputy Director of the United States Patent and Trademark Office*